(12) United States Patent
Bae et al.

(10) Patent No.: US 11,412,793 B2
(45) Date of Patent: Aug. 16, 2022

(54) SOFT SENSOR-EMBEDDED GLOVE AND METHOD FOR MANUFACTURING SAME

(71) Applicant: FEEL THE SAME, INC., Ulsan (KR)

(72) Inventors: Joon Bum Bae, Ulsan (KR); Su In Kim, Ulsan (KR); Da Hee Jeong, Ulsan (KR); Jeong Soon Hong, Ulsan (KR)

(73) Assignee: FEEL THE SAME, INC., Ulsan (KR)

( * ) Notice: Subject to any disclaimer, the term of this patent is extended or adjusted under 35 U.S.C. 154(b) by 0 days.

(21) Appl. No.: 17/101,646

(22) Filed: Nov. 23, 2020

(65) Prior Publication Data

US 2021/0153578 A1    May 27, 2021

Related U.S. Application Data

(63) Continuation-in-part of application No. PCT/KR2019/016356, filed on Nov. 26, 2019.

(30) Foreign Application Priority Data

Nov. 21, 2019  (KR) .................... 10-2019-0150491
Oct. 8, 2020   (KR) .................... 10-2020-0130183

(51) Int. Cl.
       *A41D 19/00*       (2006.01)
(52) U.S. Cl.
       CPC .................. *A41D 19/0027* (2013.01)
(58) Field of Classification Search
       CPC .... A41D 19/0027; A41D 1/005; G06F 3/014;
                                                   G06F 3/016
       See application file for complete search history.

(56) References Cited

U.S. PATENT DOCUMENTS

2016/0290880 A1\* 10/2016 Lewis ...................... G01L 1/20

FOREIGN PATENT DOCUMENTS

| EP | 3098691 A1 | 11/2016 |
|----|------------|---------|
| JP | 2016080675 A | 5/2016 |
| KR | 10-2005-0031458 A | 4/2005 |
| KR | 10-1525226 A | 6/2015 |
| KR | 10-2016-0136894 A | 11/2016 |
| KR | 10-2017-0006817 A | 1/2017 |
| KR | 10-2018-0116161 A | 10/2018 |

(Continued)

OTHER PUBLICATIONS

Lefan Wang, Design and Evaluation of a 3-D Printed Optical Sensor for Monitoring Finger Flexion, Mar. 15, 2017, IEEE Sensors Journal, vol. 17, No 6. Mar. 15, 2017, pp. 1937-1944, (Year: 2017).\*

(Continued)

*Primary Examiner* — Clinton T Ostrup
*Assistant Examiner* — Akwokwo Olabisi Redhead
(74) *Attorney, Agent, or Firm* — Novick, Kim & Lee, PLLC; Jae Youn Kim

(57) ABSTRACT

Provided is a soft sensor embedded glove including an upper inside skin pattern, a soft sensor module coupled to at least a surface of the upper inside skin pattern, and including at least one soft sensor formed on a joint portion of a finger to measure flexion and extension of the finger, and an outside skin coupled to the upper inside skin pattern and exposed to outside, wherein, in the upper inside skin pattern, a width of a region to which the at least one soft sensor is coupled is less than a width of another region.

6 Claims, 29 Drawing Sheets

(56) References Cited

FOREIGN PATENT DOCUMENTS

KR     10-2018-0133601 A     12/2018
KR     10-2019-0110169 A     9/2019

OTHER PUBLICATIONS

Okumiya Yasuo, May 16, 2016, English Machine Translation_ JP2016080675A provided by Patent Translate by EPO and Google, (Year: 2016).*
Bae Joon Bum, Dec. 17, 2018, English Machine Translation_ KR20180133601A provided by Patent Translate by EPO and Google, (Year: 2018).*

* cited by examiner

SOFT SENSOR-EMBEDDED GLOVE AND METHOD FOR MANUFACTURING SAME

TECHNICAL FIELD

The present disclosure relates to a soft sensor embedded glove and a method of manufacturing the same.

RELATED ART

Recently, there has been increasing interest in a soft sensor embedded glove that is worn on a hand for interacting with a virtual object by transmitting a force generated from the virtual object in virtual reality to a finger.

Therefore, movements of a hand have to be analyzed first, and research into easiness in wearing and accurate measurement of the hand movement has to be performed.

On the other hand, a soft sensor is a sensor having elasticity and flexibility because of including a material having elasticity and flexibility and including an electrode formed of a conductive material, so as to measure displacement or force. Recently, as application fields such as wearable equipment have expanded, demand for flexible and elastic soft sensors have been increasing.

PRIOR ART DOCUMENT

Patent Document (Patent document 1) Korean Laid-open Patent No. 10-2016-0136894

DETAILED DESCRIPTION OF THE DISCLOSURE

Technical Problem

The present disclosure provides a soft sensor embedded glove having improved performance and being easily manufactured, and a method of manufacturing the soft sensor embedded glove.

Technical Solution

Provided is a soft sensor embedded glove including an upper inside skin pattern, a soft sensor module coupled to at least a surface of the upper inside skin pattern, and including at least one soft sensor formed on a joint portion of a finger to measure flexion and extension of the finger, and an outside skin coupled to the upper inside skin pattern and exposed to outside, wherein, in the upper inside skin pattern, a width of a region to which the at least one soft sensor is coupled is less than a width of another region.

According to another aspect of the present disclosure, there is provided a method of manufacturing a soft sensor embedded glove including: forming a soft sensor module including at least one soft sensor that is formed on a joint portion of a finger to measure flexion and extension of the finger; coupling the soft sensor module to an upper inside skin pattern of the glove; and coupling the upper inside skin pattern of the glove, to which the soft sensor module is coupled, to an outside skin of the glove, wherein, in the upper inside skin pattern, a width of a region to which the at least one soft sensor is coupled is less than a width of another region.

According to an embodiment of the present disclosure, there is provided a method of manufacturing a hand wearable device including forming a first elastic layer on a base material, forming a sensor unit by printing a conductive liquid metal in a preset pattern on the first elastic layer, forming a second elastic layer on the first elastic layer, on which the conductive liquid metal is printed, and manufacturing a disc sheet including the first elastic layer, the second elastic layer, and a fabric member by attaching the fabric member to the second elastic layer.

According to an embodiment of the present disclosure, there is provided a hand wearable device including a first elastic layer, a second elastic layer arranged on the first elastic layer, a fabric member arranged on the second elastic layer, and at least one sensor unit formed by printing a conductive liquid metal between the first elastic layer and the second elastic layer, wherein the first elastic layer, the second elastic layer, and the fabric member are cut into a same shape.

According to an embodiment of the present disclosure, there is provided a hand wearable device including a finger movement sensing unit including at least one first soft sensor formed on a joint portion of a finger to measure flexion and extension of the finger, and a pressure sensing unit including a second soft sensor formed at an end portion of the finger to measure a pressure applied thereto.

Advantageous Effects of the Disclosure

According to a soft sensor embedded glove and a method of manufacturing the same of the present disclosure, the soft sensor embedded glove may be easily manufactured and may have improved performance.

MODE OF THE DISCLOSURE

Figure 1:
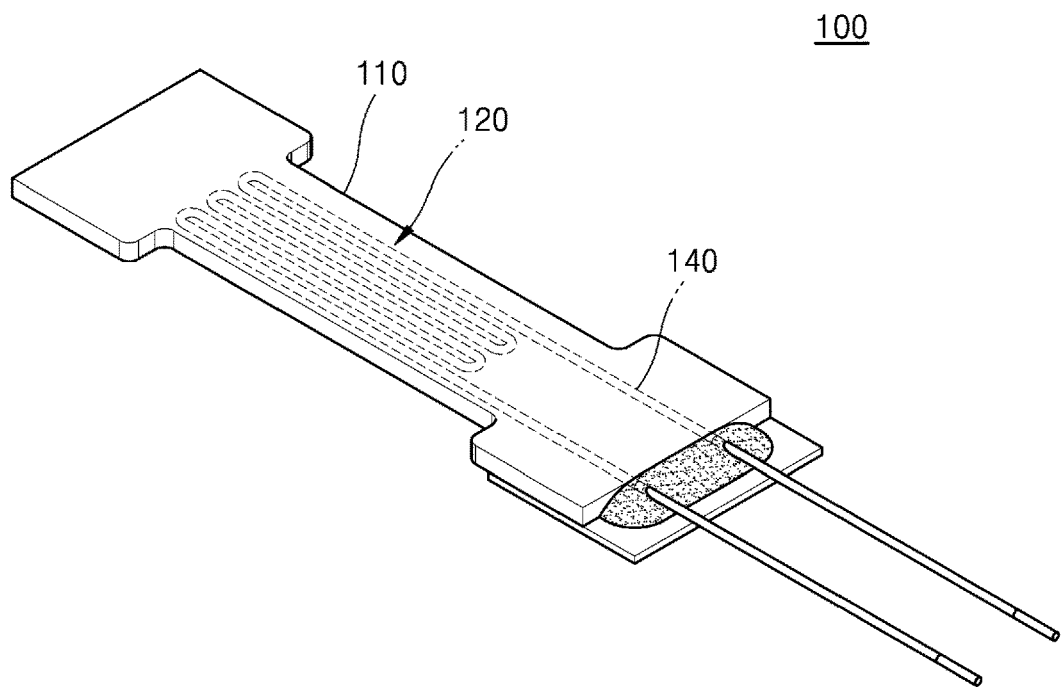
FIG. 1 is a perspective view of a soft sensor according to an embodiment of the present disclosure.

As the present disclosure allows for various changes and numerous embodiments, particular embodiments will be illustrated in the drawings and described in detail in the written description. However, this is not intended to limit the present disclosure to particular modes of practice, and it is to be appreciated that all modifications, equivalents, and/or alternatives that do not depart from the spirit and technical scope are encompassed in the present disclosure. In the description, certain detailed explanations of the related art are omitted when it is deemed that they may unnecessarily obscure the essence of the present disclosure.

It will be understood that although the terms "first," "second," etc. may be used herein to describe various components, these components should not be limited by these terms. These components are only used to distinguish one component from another. These components are only used to distinguish one component from another.

The terms used in the present specification are merely used to describe particular embodiments, and are not intended to limit the present disclosure. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Hereinafter, the exemplary embodiments will be described in detail with reference to the accompanying drawings. In the drawings, like reference numerals denote like or corresponding elements, and repeated descriptions thereof will be omitted.

Also, it will be understood that various embodiments of the present disclosure may be interpreted or implemented in combination, and technical features of each embodiment may be interpreted or implemented in combination with technical features of other embodiments.

Hereinafter, one or more embodiments of the present disclosure will be described in detail with reference to accompanying drawings.

FIG. 1 is a perspective view of a soft sensor 100 according to an embodiment of the present disclosure.

Referring to FIG. 1, the soft sensor 100 according to an embodiment of the present disclosure may include an elastic sheet 110, a sensor unit 120, and a wire unit 140.

Here, the soft sensor according to the embodiment of the present disclosure may be used to measure an angle of a joint in virtual reality, coexistent reality, or rehabilitation field, and in particular, may be used as a unit for measuring the angle of a finger joint and inputting data to a virtual reality device, etc.

Figure 8:
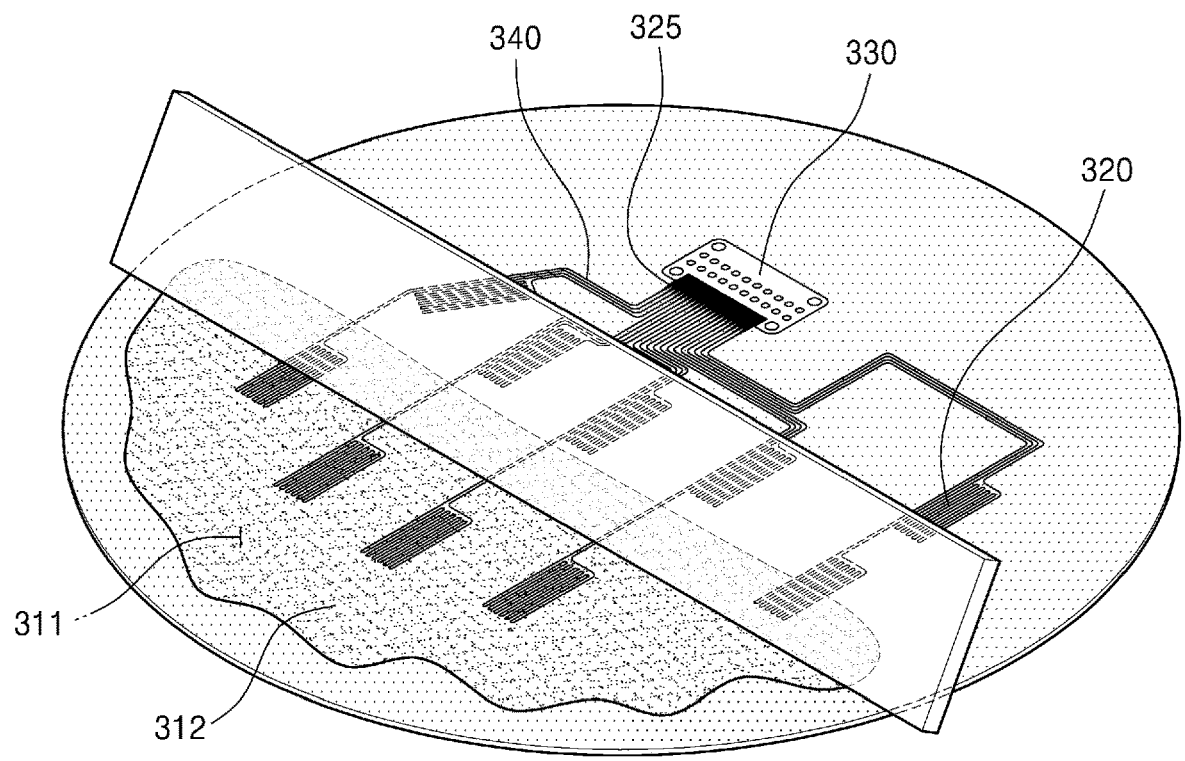

In detail, the elastic sheet 110 includes a first elastic layer (see 311 of FIG. 8) and a second elastic layer (see 312 of FIG. 8). The first elastic layer (see 311 of FIG. 8) and the second elastic layer (see 312 of FIG. 8) are separately formed, and may be stacked in a vertical direction. Here, the elastic sheet 110 is shown to have two layers, e.g., the first elastic layer (see 311 of FIG. 8) and the second elastic layer (see 312 of FIG. 8), but the concept of the present disclosure is not limited thereto. That is, the elastic sheet 110 may include two or more layers including various materials as necessary. This will be described in more detail later.

The first elastic layer (see 311 of FIG. 8) is formed by applying a first elastic material. The first elastic material may be a non-conductive material having elasticity and flexibility. Here, the first elastic material is described to use silicon as an example, but one or more embodiments of the present disclosure are not limited thereto. The first elastic layer (see 311 of FIG. 8) as above may be formed by applying the first elastic material on a base material by various methods such as spin coating, silicon coating (squeegeeing), compression molding, printing, etc.

The second elastic layer (see 312 of FIG. 8) is formed by applying a second elastic material. The second elastic material may be a non-conductive material having elasticity and flexibility. The second elastic material may be a material having a surface tension that is less than that of a conductive liquid metal (see 320 of FIG. 19) forming the sensor unit 120. In the embodiment, silicon is used as the second elastic material, and thus, the first elastic material and the second elastic material are described to be the same material as an example. However, one or more embodiments of the present disclosure are not limited thereto. Here, when the first elastic material and the second elastic material use the same silicon, the silicon may be formed as a monolithic sheet. However, one or more embodiments of the present disclosure are not limited thereto, that is, any kind of material may be used as the second elastic material provided that the material having elasticity and flexibility has a surface tension less than that of the conductive liquid metal (see 320 of FIG. 19). The second elastic layer (see 312 of FIG. 8) as above may be formed by applying the second elastic material on the first elastic layer (see 311 of FIG. 8) (and the sensor unit 120 thereon) by the various methods such as spin coating, silicon coating (squeegeeing), compression molding, printing method, etc.

The sensor unit 120 may be formed between the first elastic layer (see 311 of FIG. 8) and the second elastic layer (see 312 of FIG. 8). Here, the sensor unit 120 may be formed on the first elastic layer (311 of FIG. 8) in a preset pattern by using the conductive liquid metal (320 of FIG. 19). The sensor unit 120 may be formed by various methods such as a 3D printing method, a nozzle printing method, an inkjet printing method, a roll-to-roll printing method, etc.

The sensor unit 120 may include a certain conductive material, e.g., an applicable liquid or solid type conductive material. For example, the sensor unit 120 may be formed of the conductive liquid metal that is in a liquid phase having conductivity at room temperature. Here, the conductive liquid metal may include EGaIn as an example.

EGaIn is also referred to as eutectic gallium-indium complex. EGaIn may include 75.5 wt % of gallium (Ga) and 24.5 wt % of indium (In). The EGaIn melts at a temperature of about 15.7° C. and may maintain a liquid state at room temperature. Also, EGaIn has a high conductivity of about $3.4 \times 10^4$ S/cm, flows well due to a low viscosity, and has a high surface tension due to an oxide film on the surface thereof. EGaIn may maintain a shape thereof due to high surface tension thereof when being 3D printed in a desired pattern, and thus it is easy to form a micro-channel. Also, EGaIn may be directly printed in a desired pattern by being injected through a syringe coupled to a Computer Numeral Control (CNC) facility without performing a separate chemical treatment.

As described above, when the sensor unit 120 is formed of the conductive liquid metal, a sufficient elasticity may be obtained.

In addition, the soft sensor may be located at each joint in each finger and between the thumb and the index finger on a surface of the hand wearable device, and the soft sensor provided between the thumb and the index finger may be provided for sensing adduction and abduction movements of the thumb.

Also, the soft sensor provided at the joint of each finger may include both a sensor for measuring flexion and extension movements and a sensor for measuring adduction and abduction movements.

Alternatively, the soft sensor provided at the joint of each finger may separately include a sensor for measuring flexion and extension movements and a sensor for measuring adduction and abduction movements. Here, the sensor for measuring the flexion and extension movements is formed in a lengthwise direction of the fingers for measuring the flexion and extension of each of the fingers. In addition, the sensor for measuring the adduction and abduction movements is formed perpendicularly to the lengthwise direction of the fingers or elongated in the adduction and abduction directions of the fingers, for measuring the abduction and abduction of each of the fingers. Here, the sensor for measuring the flexion and extension movements and the sensor for measuring the adduction and abduction movement has a length, a height, and a width which vary depending on movements of the fingers, thereby changing a resistance of the sensor. Thus, the movement of the finger may be measured by measuring a variation in the resistance. This will be described in more detail later with reference to FIGS. 2 and 3.

The wire unit 140 is electrically connected to the sensor unit 120, and may transfer an electrical signal from the sensor unit 120 to an electrode substrate (see 270 of FIG. 4) or an FFC (not shown) that will be described later. The wire unit 140 as above may be formed by printing the conductive liquid metal on the first elastic layer (311 of FIG. 8) or a base material by using a 3D printer, etc.

Hereinafter, operating principles of the soft sensor according to the embodiment of the present disclosure will be described below in more detail.

Figure 2:
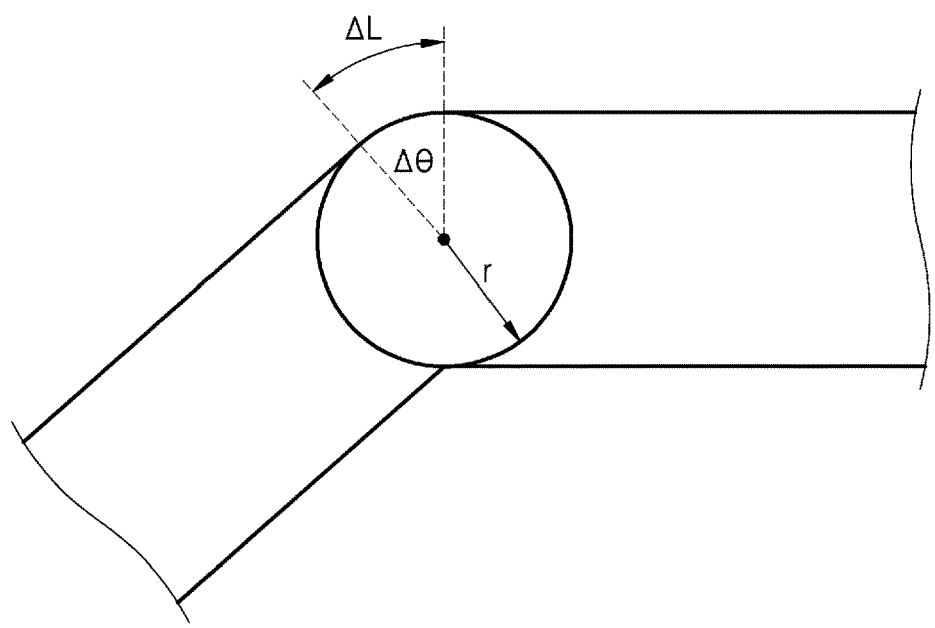
FIG. 2 is a schematic diagram showing a change in a length of a signal line according to a change in a finger joint, in the soft sensor of FIG. 1.

FIG. 2 is a schematic diagram showing a change in a length of the sensor unit 120 according to a change in a joint angle of the finger, in the soft sensor according to the embodiment.

Referring to FIG. 2, the soft sensor according to the present embodiment may have following principles.

In general, when a resistance between opposite ends of the micro-channel of the soft sensor is R (resistance of conductive metal), a specific resistance of a conductive material in the channel is ρ (electrical specific resistance [Ω*m]), a channel volume is V (channel volume [m3]), a cross-sectional area of the channel is A (channel area [m2]), a channel length is l (channel length [m]), and a strain is ε, a total volume V of the micro-channel is constantly maintained and expressed by Equation 1 below when the micro-channel in the material having high elasticity is filled with an incompressible material.

$$V = A_0 l_0 = Al \quad \text{[Equation 1]}$$

Here, the channel may be a passage through which electrons of the conductive metal pass. When an outer appearance of the conductive metal changes, a length, a height, a width, etc. of the channel may change, and accordingly, the resistance also changes.

Here, the channel length l is expressed by Equation 2 below, and the cross-sectional area A of the channel is expressed by Equation 3 below.

$$l = l_0(1+\varepsilon) \quad \text{[Equation 2]}$$

$$A = A_0/(1+\varepsilon) \quad \text{[Equation 3]}$$

In addition, a resistance of the conductive metal is expressed by Equation 4 below.

$$R = \rho l/A \quad \text{[Equation 4]}$$

In addition, a current resistance R may be expressed by Equation 5 below according to an initial resistance ($R_0$) and the strain ε.

$$R = R_0(1+\varepsilon)^2 \quad \text{[Equation 5]}$$

Referring to FIG. 2, a variation (Δθ) in the angle of the finger joint, a radius (r), and a variation (ΔL) in the channel length may be expressed by Equation 6 below.

$$\Delta L = r\Delta\theta \quad \text{[Equation 6]}$$

When Equation 6 above is transposed, Equation 7 below is derived.

$$\Delta\theta = \Delta L/r \quad \text{[Equation 7]}$$

Here, because r is a constant, the variation (Δθ) in the finger joint may be calculated through the variation (ΔL) in the channel length.

Here, an appropriately formed amplifier may be used to measure the variation in the resistance of the soft sensor, and the variation (ΔR) in the resistance of the soft sensor may be calculated from the variation (ΔV) in a voltage measured as an output from the amplifier according to the characteristics of the amplifier.

Here, the strain ε is calculated by the measured resistance variation (ΔR) of the soft sensor according to Equation 5 above, and the variation (ΔL) in the channel length may be calculated by using the strain ε.

Therefore, when the sensor for measuring the variation (ΔV) in the voltage is included in the soft sensor according to the present embodiment, the variation (Δθ) in the angle of the finger joint may be calculated.

For convenience of description, the finger joints are described as an example, but the soft sensor according to the present embodiment may be applied to all joints of the other body parts.

Figure 3:
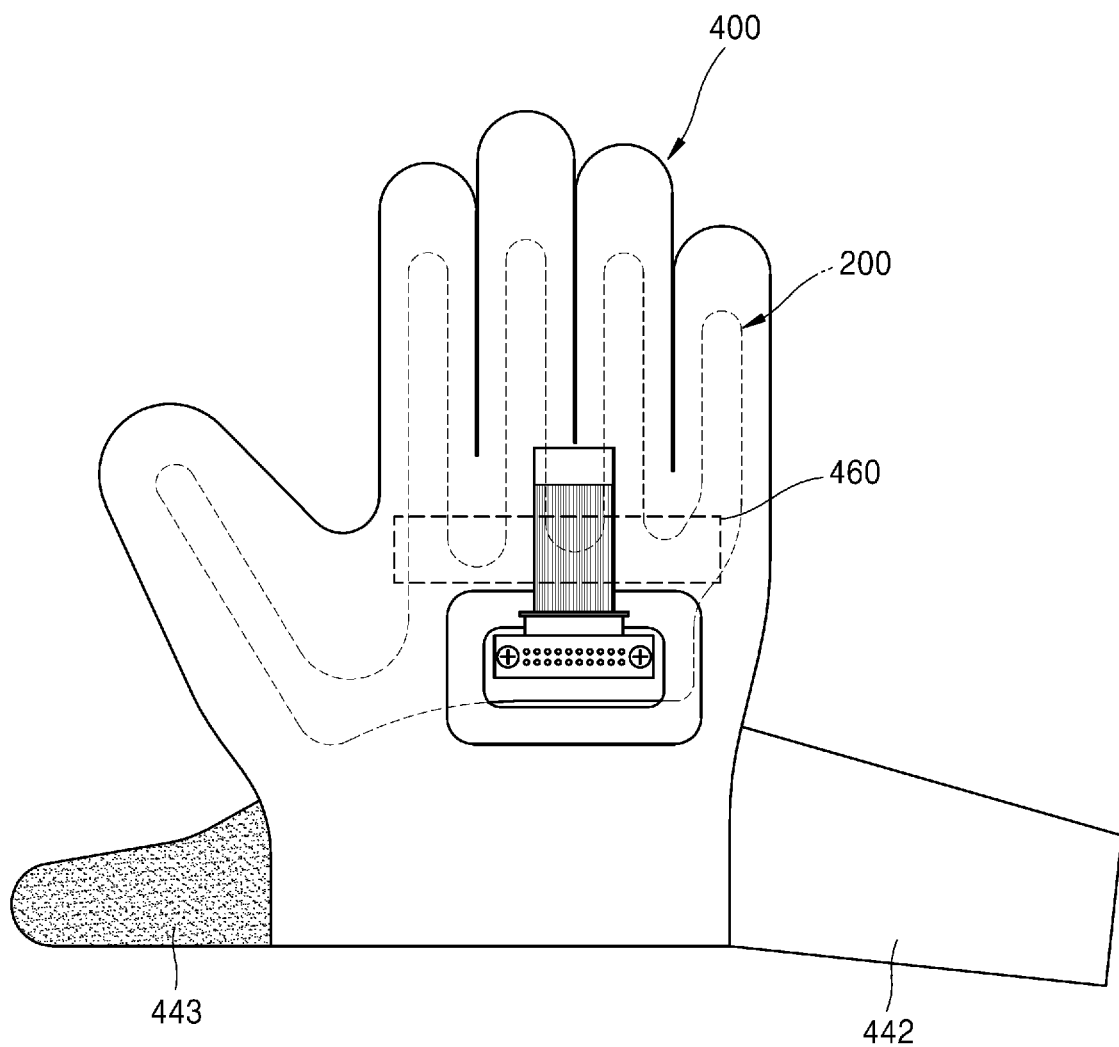
FIG. 3 is a plan view of a glove having the soft sensor of FIG. 1 is built therein.
Figure 4:
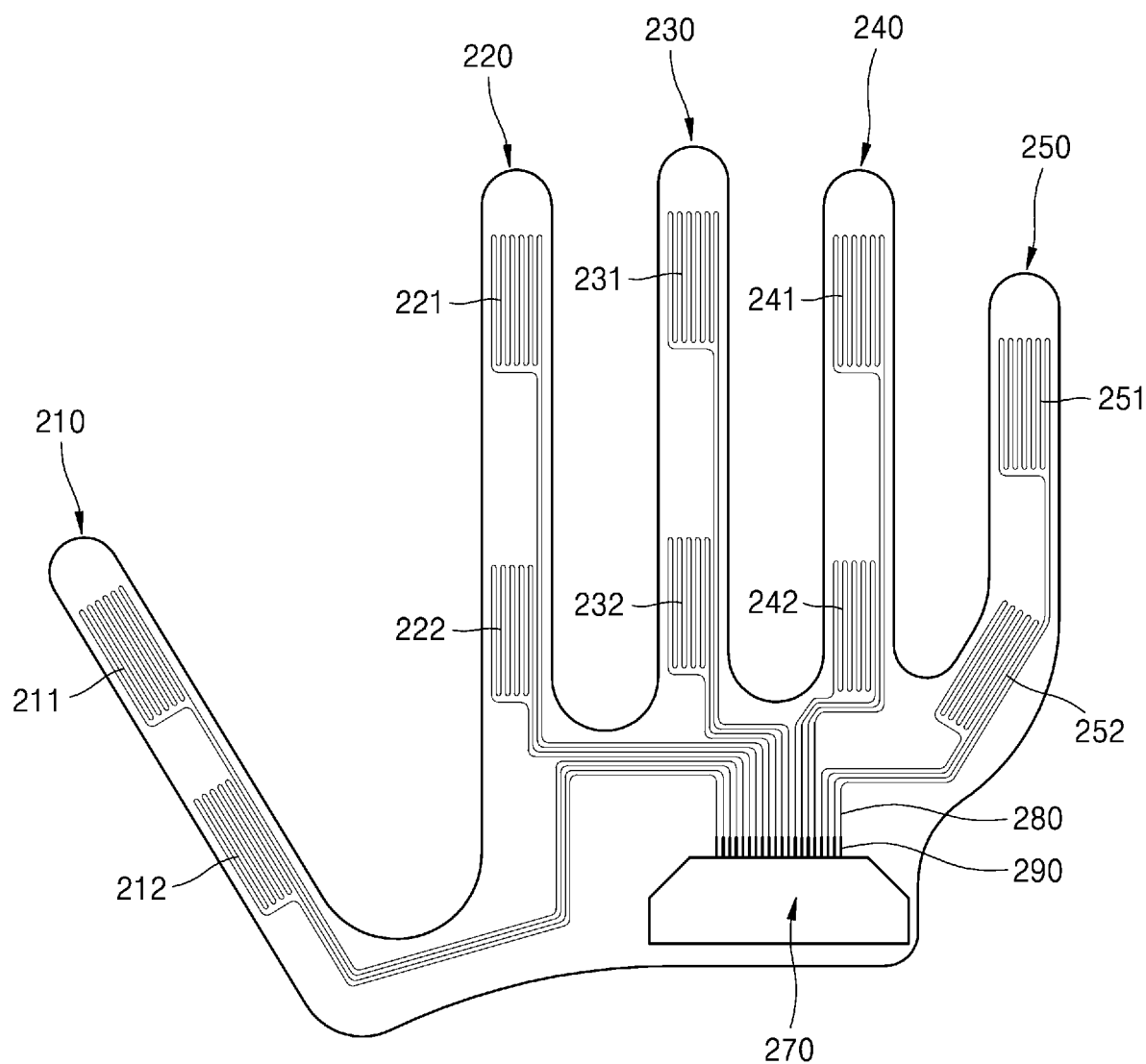
FIG. 4 is a plan view of a soft sensor module in the soft sensor embedded glove of FIG. 3.

FIG. 3 is a plan view of a soft sensor embedded glove including the soft sensor of FIG. 1 therein, and FIG. 4 is a plan view of a soft sensor module in the soft sensor embedded glove of FIG. 3.

Referring to FIGS. 3 and 4, the soft sensor module 200 may include a sheet formed of an elastic material, on which a plurality of soft sensors 100 corresponding respectively to joints of fingers are formed. Here, the soft sensor module 200 may be formed to have a shape corresponding to at least a part of a shape of a hand. In the present embodiment, an example in which the soft sensor module 200 is formed as a sheet having a hand shape to be attached to an inside skin of the glove 400. The soft sensor module 200 as above may be formed by forming a circular shape or a square shape that is larger than a desired shape, and then cutting into the desired shape through a laser cutting method, a knife cutting method, a knife mold cutting method, etc. That is, regions in the elastic sheet 110 other than the portions where the plurality of sensor units 120 are formed may be used after being cut into a shape suitable for a wearing part such as a finger. The plurality of sensor units 120 may be located at joints of the fingers for sensing movements of the fingers.

Here, the soft sensor embedded glove 400 according to the embodiment of the present disclosure has the soft sensor module 200 coupled to or built in the glove, that is, the inside skin of the glove.

In detail, when the soft sensor is attached on a commercial glove by using bond, silicone, etc., the soft sensor needs to be attached in a state in which a user is wearing the glove for accurately fixing the location of the sensor.

However, in this case, because the soft sensor is exposed on an outer portion of the glove, durability of the soft sensor degrades and outer appearance thereof is not good. Also, during the manufacturing processes of the glove, a location of attaching the sensor to an outer surface of the glove varies depending on operators, and the sensor location is affected by the operator's skill level, and two or more operators are necessary.

To address the above issues, the soft sensor embedded glove 400 according to the embodiment of the present disclosure has the soft sensor module 200 coupled to or built in the glove, that is, the inside skin of the glove. As described above, when the soft sensor module 200 is coupled to the inside of the glove, that is, the inside skin of the glove, the soft sensor may be built in the glove to be protected by the glove, and thereby improving durability of the soft sensor module 200. In addition, because a kind of patterning method is used, that is, a position of the glove is fixed by using a position fixing guide and the soft sensor module 200 is attached thereto by using a guide, working difficulty may be reduced, and mass sewing of the gloves may be performed after attaching the soft sensor modules 200 to mass amount of patterns to improve productivity. Moreover, because the soft sensor module 200 is formed in the glove, no trace of an adhesive that is used to attach the soft sensor module 200 is visible, and thus, aesthetic effect may be improved.

The soft sensor module 200 of FIGS. 3 and 4 will be described in more detail below.

The soft sensor module 200 includes a thumb sensing unit 210, an index finger sensing unit 220, a middle finger sensing unit 230, a ring finger sensing unit 240, and a little finger sensing unit 250. The soft sensor module 200 may include only some of the above sensing units.

In addition, although not shown in the drawings, the soft sensor module 200 may further include a first adduction/abduction measurement sensor (not shown) formed between the thumb sensing unit 210 and the index finger sensing unit 220, a second adduction/abduction measurement sensor (not shown) formed between the index finger sensing unit 220 and the middle finger sensing unit 230, and a third adduction/abduction measurement sensor (not shown) formed at a side surface of the index finger sensing unit 220 to measure the adduction/abduction of the index finger.

Also, although not shown in the drawings, the soft sensor module 200 may further include a fourth adduction/abduction measurement sensor (not shown) formed between the middle finger sensing unit 230 and a ring finger sensing unit (not shown), and a fifth adduction/abduction measurement sensor (not shown) formed between the ring finger sensing unit (not shown) and the little finger sensing unit (not shown).

The thumb sensing unit 210 may include a first thumb part sensor 211 and a second thumb part sensor 212. The first thumb part sensor 211 may measure flexion and extension between a distal phalanx and a proximal phalanx of the thumb. The second thumb part sensor 212 may measure flexion and extension between the proximal phalanx and metacarpals of the thumb.

The index finger sensing unit 220 may include a first index finger part sensor 221 and a second index finger part sensor 222. The first index finger part sensor 221 may measure flexion and extension between a middle phalanx and a proximal phalanx of the index finger. The second index finger part sensor 222 may measure flexion and extension between the proximal phalanx and metacarpals of the index finger.

The middle finger sensing unit 230 may include a first middle finger part sensor 231 and a second middle finger part sensor 232. The first middle finger part sensor 231 may measure flexion and extension between a middle phalanx and a proximal phalanx of the middle finger. The second middle finger part sensor 232 may measure flexion and extension between the proximal phalanx and metacarpals of the middle finger.

The ring finger part sensing unit 240 may include a first ring finger part sensor 241 and a second ring finger part sensor 242. The first ring finger part sensor 241 may measure flexion and extension between a middle phalanx and a proximal phalanx of the ring finger. The second ring finger part sensor 242 may measure flexion and extension between the proximal phalanx and metacarpals of the ring finger.

The little finger sensing unit 250 may include a first little finger part sensor 251 and a second little finger part sensor 252. The first little finger part sensor 251 may measure flexion and extension between a middle phalanx and a proximal phalanx of the little finger. The second little finger part sensor 252 may measure flexion and extension between the proximal phalanx and metacarpals of the little finger.

The first adduction/abduction measurement sensor (not shown) is provided between the thumb sensing unit 210 and the index finger sensing unit 220 to measure the adduction and abduction of the thumb.

The second adduction/abduction measurement sensor (not shown) is provided between the index finger sensing unit 220 and the middle finger sensing unit 230 to measure the adduction and abduction of the middle finger.

Here, the soft sensor module 200 according to an embodiment of the disclosure may further include a third adduction/abduction measurement sensor (not shown) at a side of the index finger in order to separate a signal from the adduction/abduction measurement sensor from a signal from a flexion and extension measurement sensor. That is, the third adduction/abduction measurement sensor (not shown) is additionally provided at a side of the index finger so as to independently measure the adduction/abduction of the index finger and the middle finger.

Here, the first thumb part sensor 211, the second thumb part sensor 212, the first index finger part sensor 221, the second index finger part sensor 222, the first middle finger part sensor 231, the second middle finger part sensor 232, the first ring finger part sensor 241, the second ring finger part sensor 242, the first little finger part sensor 251, and the second little finger part sensor 252 may each be the sensor unit 120 of the soft sensor 100 shown in FIG. 1. Also, each of wire units 280 extending from respective sensors may be the wire unit 140 of the soft sensor 100 shown in FIG. 1.

Here, in the soft sensor module 200 according to the embodiment of the present disclosure, the plurality of sensor units 120 respectively corresponding to joints of various fingers having different lengths and shapes may be designed by using a Computer-Aided Design (CAD), and the designed plurality of sensor units 120 may be formed at once through a 3D printing, etc. Thus, the soft sensor module 200 may be manufactured systematically. It is easier to modify the design as compared with a mold manufacturing method according to the related art, and because a dedicated mold is not necessary, manufacturing processes may be simplified and costs may be reduced. Therefore, it is easy to form the sensor units 120 in various numbers and various shapes, and thus, the embodiment of the disclosure may be easily applied to other body parts, e.g., shoulders, ankles, wrists, fingers, etc.

Although not shown in the drawings, the soft sensor module 200 may further include a chip. The chip may be inserted into a location, in the elastic sheet 110, corresponding to a wrist. The chip may be inserted by an insert printing method. The chip may include a Flexible Printed Circuit Board (FPCB), a motor driver, a micro-control unit, a wireless communication unit, etc.

Also, the soft sensor module 200 according to an embodiment of the disclosure may further include an electrode substrate 270 and a connector 290.

The electrode substrate 270 is formed on the soft sensor module 200 so as to connect an external electronic device (e.g., connector, etc.) to soft sensors. Here, the electrode substrate 270 may include various circuit boards such as an FPCB, etc. In addition, the electrode substrate 270 may be in contact with or coupled to the FPCB, etc.

Here, the electrode substrate 270 may be formed by an insert printing method. That is, the first elastic layer (see 311 of FIG. 8) is formed, and after that, the electrode substrate 270 may be inserted onto the first elastic layer. Here, the electrode substrate 270 may be located on a region on the first elastic layer (see 311 of FIG. 8), wherein the electrode substrate 270 is not interfered with a movement of the wrist and does not infiltrate into locations of the sensors. Also, the electrode substrate 270 may be located on a region capable of minimizing distances between the sensors and the electrode substrate 270 in order to minimize the length of the wire unit 140. For example, the electrode substrate 270 may be formed on the back of the hand, which is adjacent to the wrist. For ensuring durability, a periphery of the electrode substrate 270 may need to be reinforced with a hard material, and thus, the electrode substrate 270 may be located at the back of the hand, not on the wrist part which flexibly moves. The location and method of forming the electrode substrate 270 will be described in more detail later.

The connector 290 may connect the wire units 280 of the soft sensor 100 to the electrode substrate 270. The connector 290 may include a certain conductive material, e.g., an applicable liquid or solid type conductive material. For example, the connector 290 may be formed of the conductive liquid metal that is in a liquid phase having conductivity at room temperature. Here, the conductive liquid metal may include EGaIn as an example.

The connector 290 may be formed in a preset pattern by using a conductive liquid metal, and the connector 290 may be formed of a material such as EGaIn by various methods such as a 3D printing method, a nozzle printing method, an inkjet printing method, a roll-to-roll printing method, etc.

Also, according to the present disclosure, an electrode unit may be stably formed regardless of a thickness of a channel, a channel size, the number of channels, a material of the soft sensor, etc. In addition, automation may be achieved by using the printing equipment, and thus, an effect of reducing working time may be obtained. Also, an electrode unit having a compact structure may be formed.

FIGS. 5 to 15 are diagrams illustrating a method of manufacturing a soft sensor embedded glove according to an embodiment of the present disclosure.

FIGS. 5 to 10 are diagrams illustrating processes of forming the soft sensor module 200.

Figure 5:
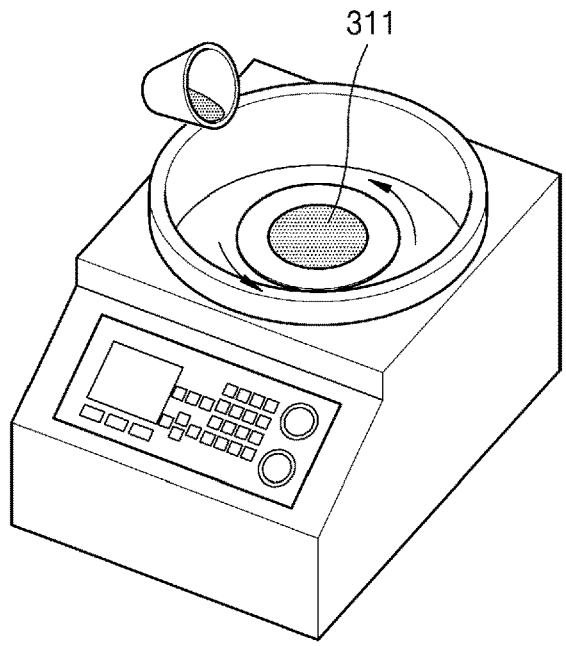
FIGS. 5 to 15 are diagrams illustrating a method of manufacturing a soft sensor embedded glove according to an embodiment of the present disclosure.

Referring to FIG. 5, a first elastic material is spin-coated on a base material to form the first elastic layer 311. Here, the first elastic layer 311 may be formed by using the first elastic material having a relatively high elasticity. In the drawing, the first elastic layer 311 is formed by the spin coating method, but the concept of the present disclosure is not limited thereto, that is, the first elastic layer 311 may be formed by various methods such as a silicon coating method, a printing method, etc.

Figure 6:
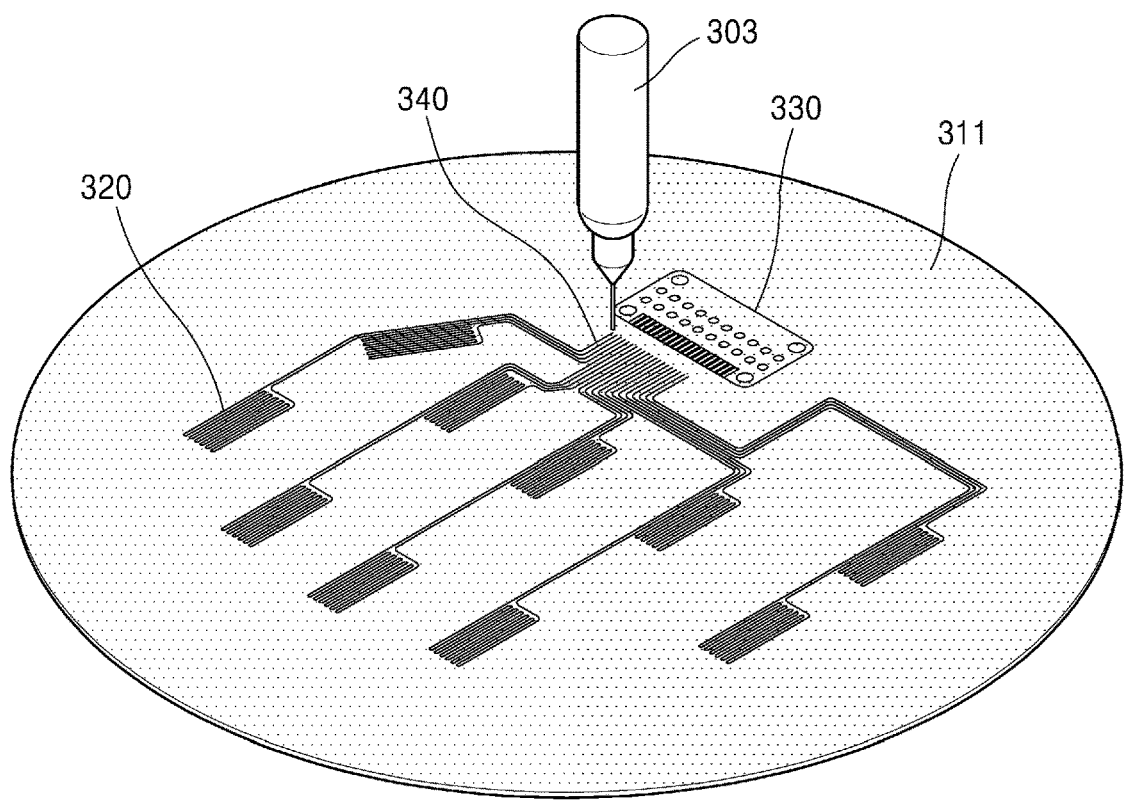

Next, referring to FIG. 6, an electrode substrate 330 is arranged on the first elastic layer 311, and the electrode substrate 330 may be fixed by a bond or an adhesive tape. In addition, the conductive liquid metal is printed on the first elastic layer 311 through a nozzle 303 to form sensor units 320 and wire units 340. Here, the conductive liquid metal printed through the nozzle 303 may include EGaIn. The nozzle 303 may be coupled to a CNC facility and may be controlled to be movable in three-axis direction. The CNC facility may include a 3D printer, and may further include a three-axis controller, a scan controller, a microscope, etc. The nozzle 303 may print the conductive liquid metal while moving in a preset path according to a control of the three-axis controller. The path in the three-axis direction may be set separately according to a channel pattern.

Figure 7:
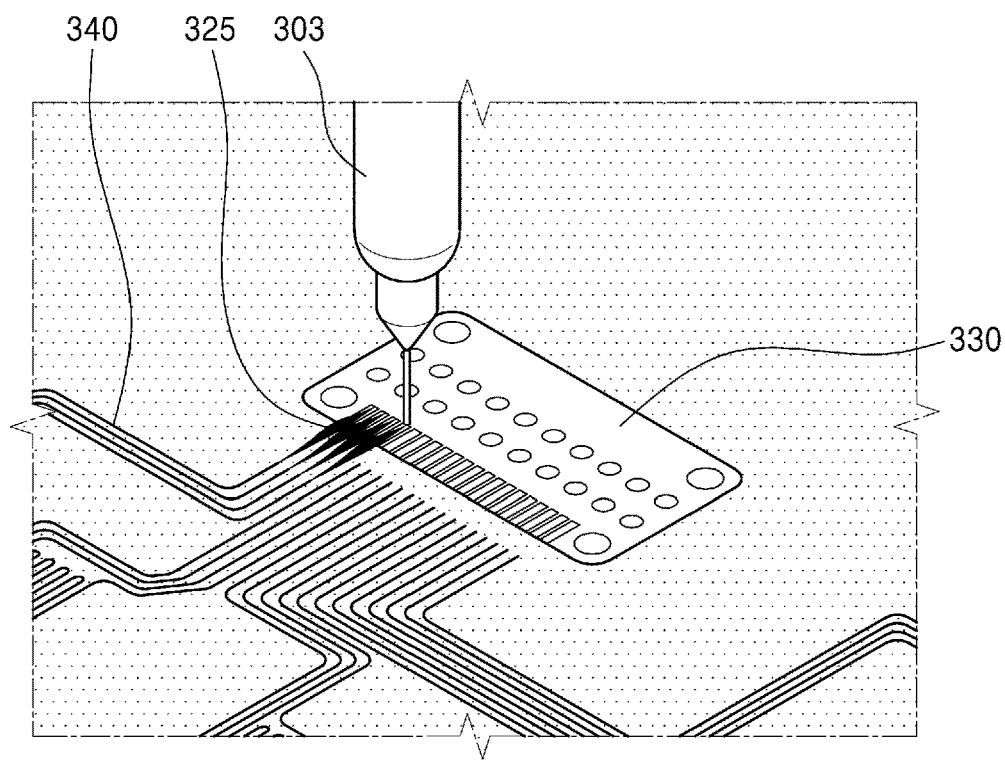

Referring to FIG. 7, a connector 325 connecting the wire units 340 to the electrode substrate 330 is printed. The connector 325 may be provided in or at a side of the elastic sheet 110, so as to connect the wire units 340 to the electrode substrate 330.

Next, referring to FIG. 8, a second elastic material is applied onto the first elastic layer 311, on which the sensor units 320, the wire units 340, the connector 325, the electrode substrate 330, etc. are formed, to form a second elastic layer 312. Here, the second elastic layer 312 may be formed of the same material as that of the first elastic layer 311, or may be formed as a layer having a different physical property from that of the first elastic layer 311 as necessary. In the drawings, the second elastic layer 312 is formed by a silicon coating method, but the concept of the present disclosure is not limited thereto, that is, the second elastic layer 312 may be formed by various methods such as a spin coating method, a printing method, etc.

Here, the conductive liquid metal of the sensor unit 320 is in the liquid phase, but a surface tension of the conductive liquid metal is very high. Thus, even when the second elastic material is applied onto the sensor unit 320 in the liquid phase, the second elastic material and the conductive liquid metal are not mixed with each other. Therefore, the channel patterns of the sensor units 320 may be covered by the second elastic material while maintaining the shapes thereof.

Figure 9:
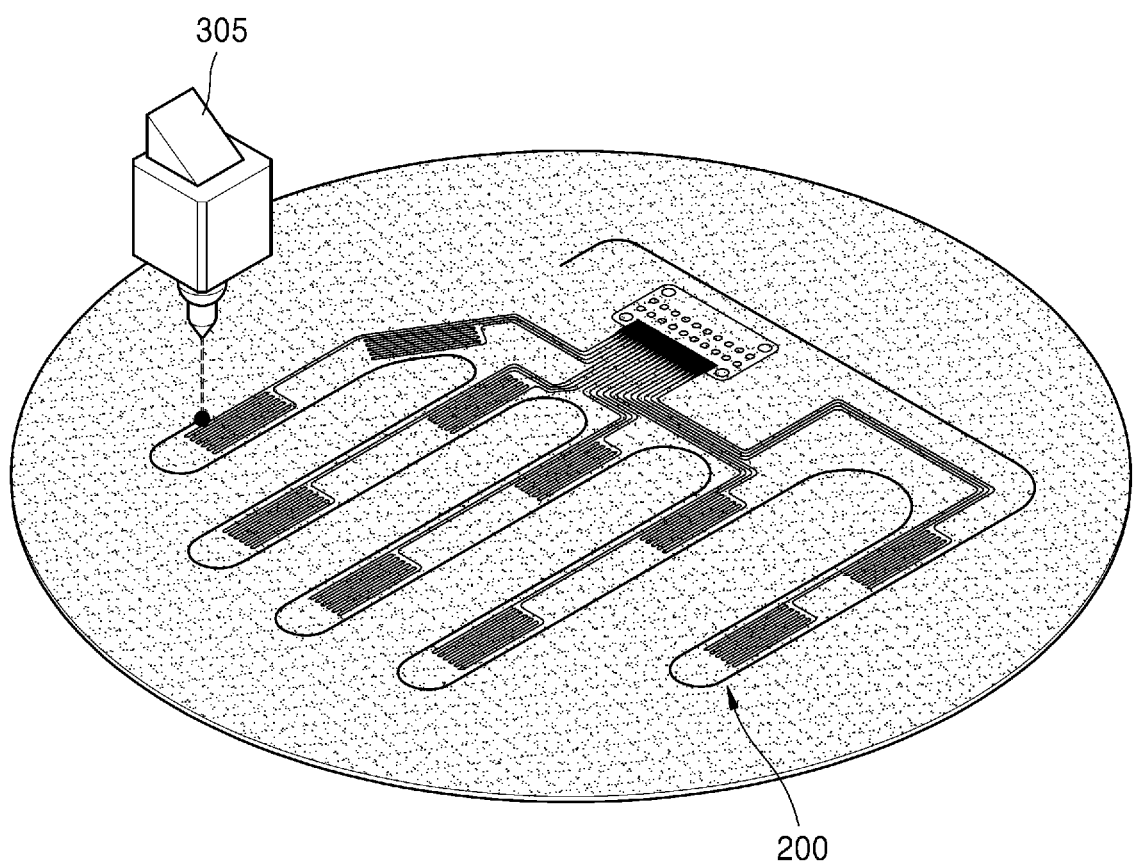
Figure 10:
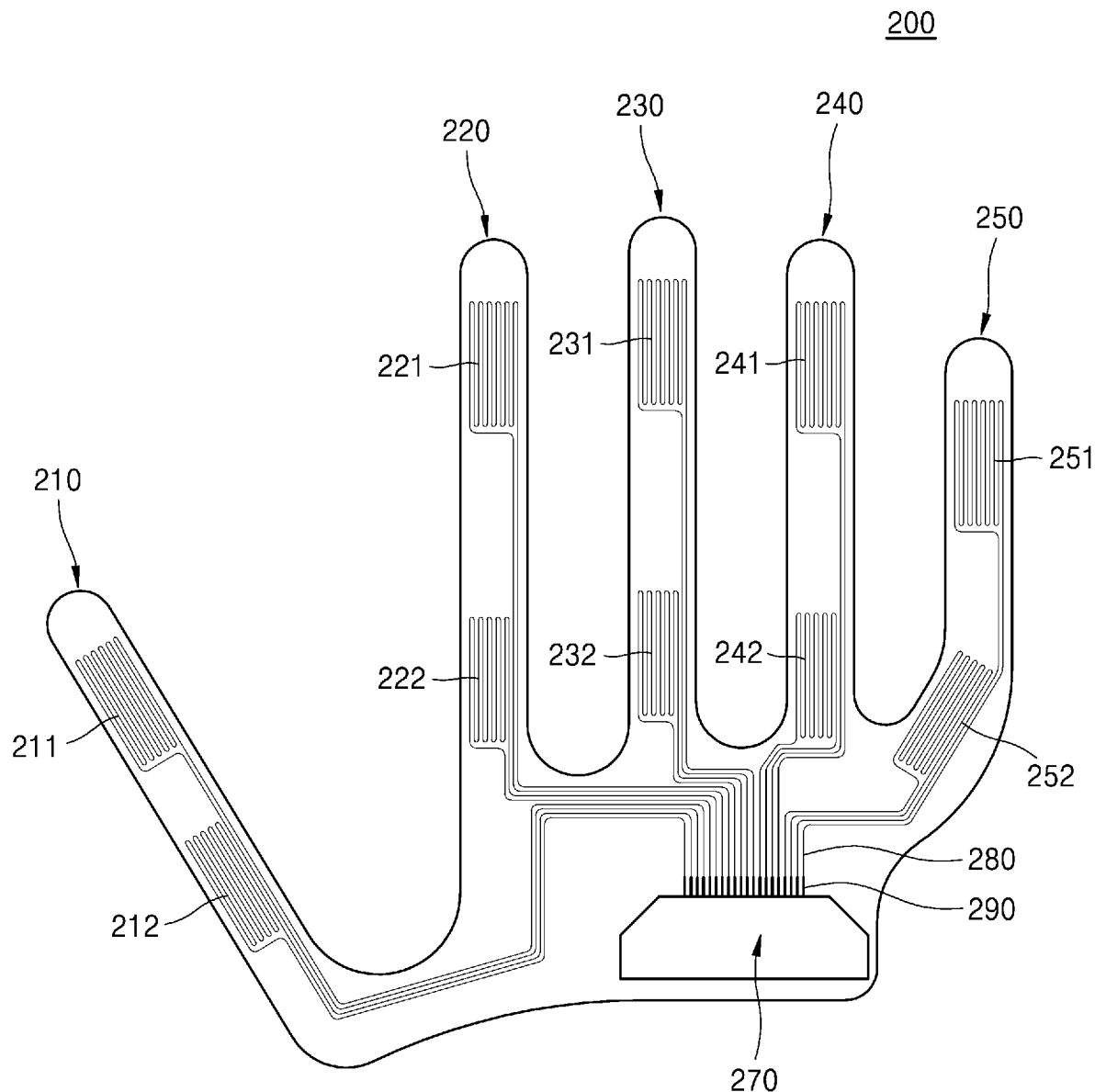

Next, referring to FIG. 9, when the second elastic layer 312 is hardened, the second elastic layer 312 is cut into a desired shape by using a laser cutting machine 305, by a knife cutting method, by a knife mold cutting method, etc. to form the soft sensor module 200. Next, the soft sensor module 200 is detached from the base material, and then, the soft sensor module 200 as shown in FIG. 10 may be completed.

Next, processes of forming the soft sensor embedded glove 400 using the soft sensor module 200 will be described below.

Figure 11:
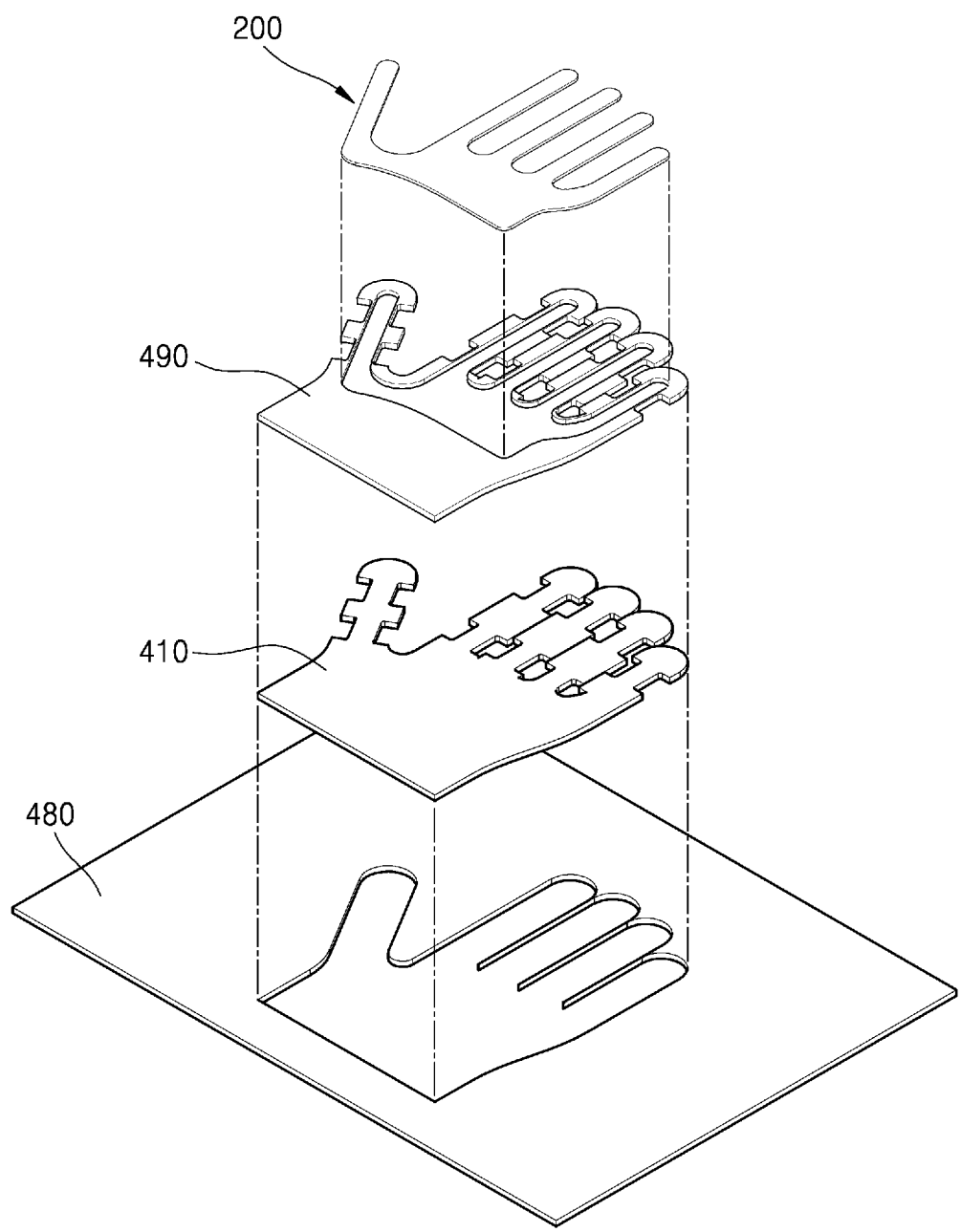

First, referring to FIG. 11, an upper inside skin pattern 410 of the glove is coupled to the soft sensor module 200 by using a glove fixing guide 480 and a sensor location fixing guide 490. The upper inside skin pattern 410 of the glove is fixed on the glove fixing guide 480 which is formed of a hard material such as acryl, etc. and has an opening formed therein, the opening having a shape corresponding to the upper inside skin pattern 410 of the glove. Next, the sensor location fixing guide 490 is located above the upper inside skin pattern 410 of the glove, wherein the sensor location fixing guide 490 is formed of a hard material such as acryl, etc. and has an opening of a shape corresponding to the soft sensor module 200 therein.

Here, the upper inside skin pattern 410 of the glove may be formed to have a length less than that of the related art. When the upper inside skin pattern 410 of the glove is formed to be short, signals sensed by using pre-tension that is generated from the glove when being worn on a hand may be increased.

Figure 12:
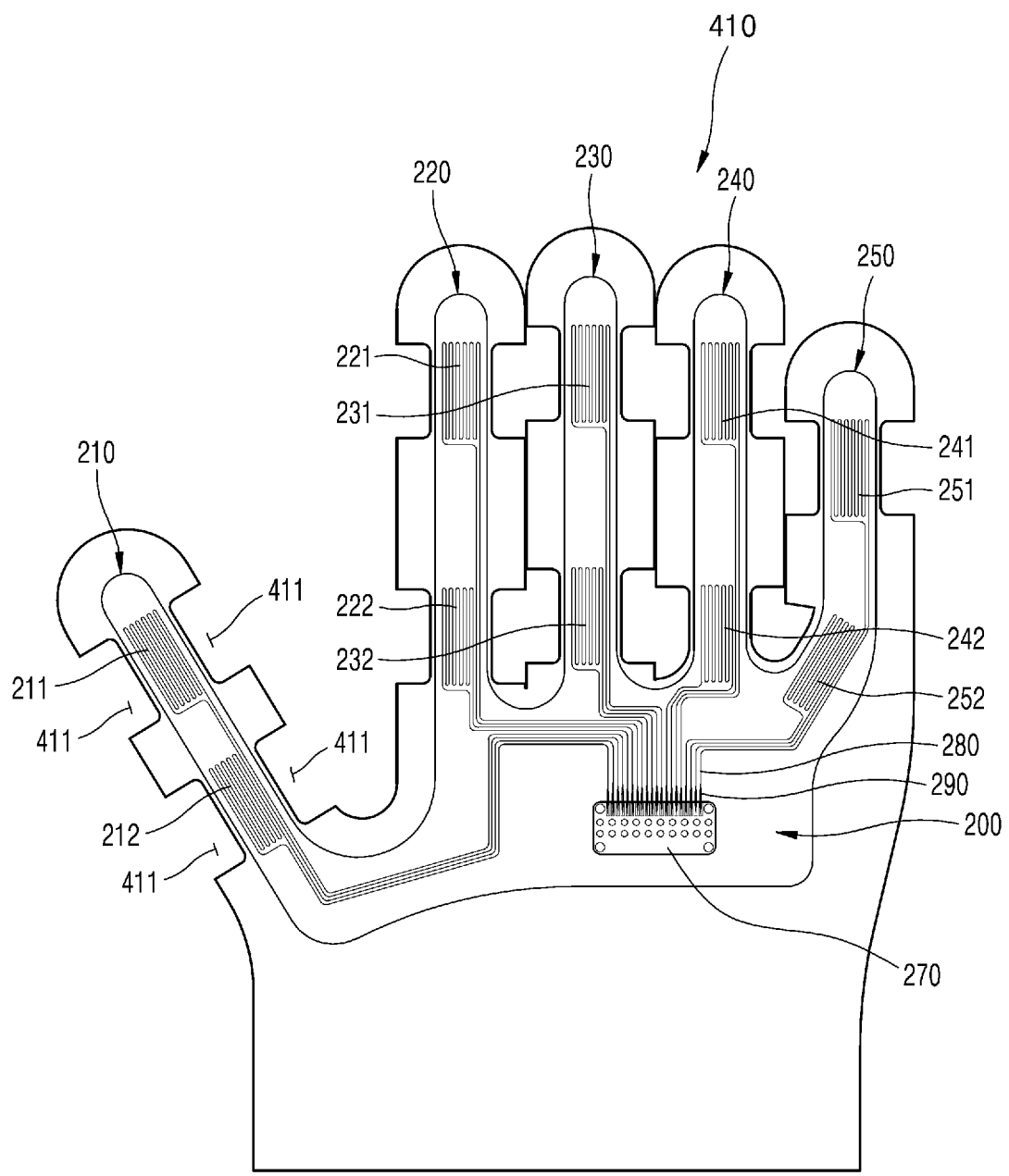

Next, when the soft sensor module 200 is attached to the upper inside skin pattern 410 of the glove, a shape as shown in FIG. 12 is obtained. Here, the soft sensor module 200 and the upper inside skin pattern 410 of the glove may be bonded to each other via silicone, other adhesives, etc. As described above, when the upper inside skin pattern 410 of the glove and the soft sensor module 200 are coupled to each other by using the glove fixing guide 480 and the sensor location fixing guide 490, the sensor may be attached to a fixed location. Then, the operator does not need to be skilled, and the convenience in attaching the sensor may be improved.

Here, the upper inside skin pattern 410 of the soft sensor embedded glove 400 according to an embodiment of the invention has a shape obtained by removing regions which are adjacent to the regions where the sensors 211, 212, 221, 222, 231, 232, 241, 242, 251, and 252 of the soft sensor module 200 in a state in which the soft sensor module 200 and the upper inside skin pattern 410 are coupled to each other.

That is, in the upper inside skin pattern 410, regions where the sensors 211, 212, 221, 222, 231, 232, 241, 242, 251, and 252 are coupled have widths that are narrower than those of the other regions. Alternatively, it may be expressed that grooves 411 are formed adjacent to the sensors 211, 212, 221, 222, 231, 232, 241, 242, 251, and 252, that is, opposite sides of the sensors 211, 212, 221, 222, 231, 232, 241, 242, 251, and 252.

As described above, a pattern width of the inside skin corresponding to the sensor unit is reduced so that a tension may be concentrated onto the sensor unit, and thus, the tension of the sensor may be maximized and a tensile resistance may be reduced.

Figure 13A:
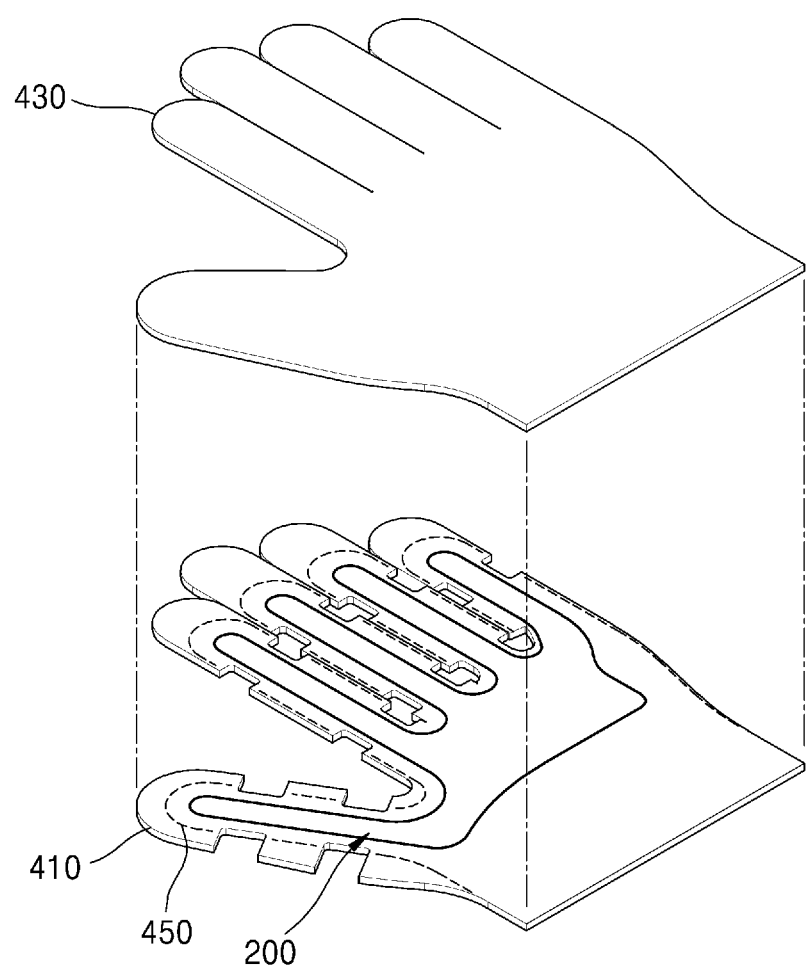
Figure 13B:
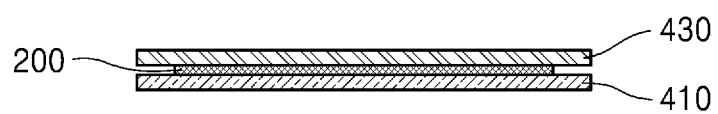

Next, as shown in FIG. 13, the upper inside skin pattern 410 of the glove, to which the soft sensor module 200 is coupled, and an upper outside skin pattern 430 of the glove are coupled to each other. Here, various sewing operations, e.g., attaching of a hook-and-loop fastener and forming of an opening, may be performed on the upper inside skin pattern 410 and the upper outside skin pattern 430 of the glove.

When the upper inside skin pattern 410 and the upper outside skin pattern 430 of the glove are sewed to be coupled to each other, regions other than the regions where the sensors 211, 212, 221, 222, 231, 232, 241, 242, 251, and 252 are formed may be sewed as expressed as a sewing line 450 of FIG. 13.

As described above, the regions other than the regions where the sensors are formed are sewed such that the tension may be concentrated on the sensors, and thus the tension of the sensor may be maximized and the tensile resistance may be reduced.

Figure 14A:
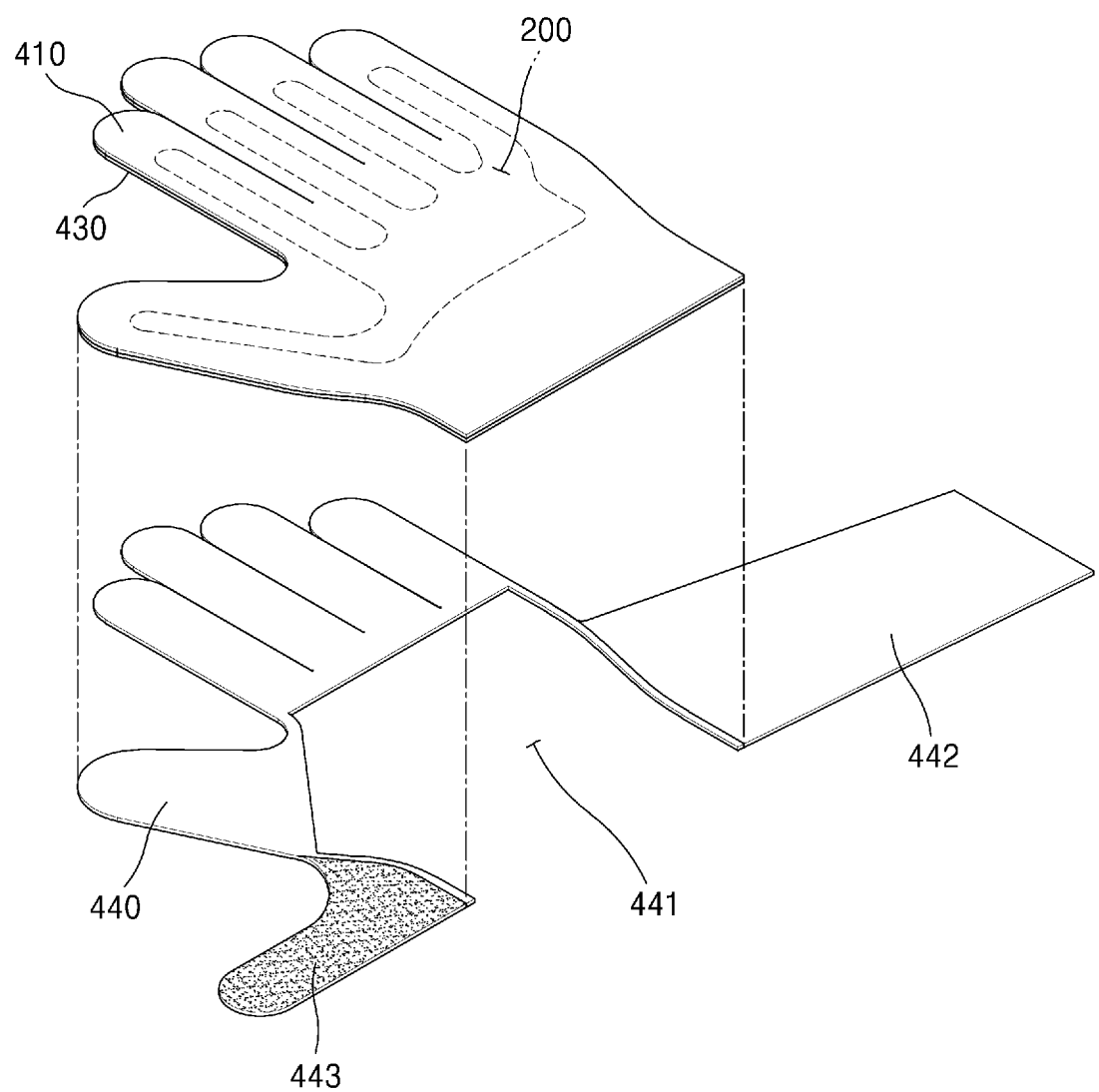
Figure 14B:
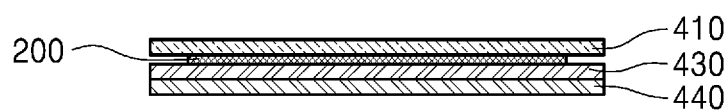

Next, as shown in FIG. 14, the upper inside skin pattern 410 and the upper outside skin pattern 430 of the glove that are in a coupling state are coupled to a lower outside skin pattern 440 of the glove. Here, the sewing may be performed in the upper outside skin pattern 430 and the lower outside skin pattern 440 of the glove are in contact with each other. Because the sewing is performed along outlines of the upper outside skin pattern 430 and the lower outside skin pattern 440 of the glove, a space in which the hand may enter may be formed between the upper outside skin pattern 430 and the lower outside skin pattern 440. Also, the regions other than the regions where the sensors (see 211, 212, 221, 222, 231, 232, 241, 242, 251, and 252 of FIG. 12) are formed may be sewn. Here, the lower outside skin pattern 440 having a simple shape is shown, but finger side patterns (not shown) may be added for improving fit.

Here, an opening 441 may be formed in a palm portion of the lower outside skin pattern 440 of the glove. That is, according to the glove of the related art, tension of the sensor is interfered with the palm portion having a fixed shape. To address the above issue, in the embodiment of the present disclosure, the opening 441 is formed in the palm portion of the lower outside skin pattern 440 of the glove such that the sensor may be freely tensioned. As described above, the opening 441 is formed, and thereby forming a structure having an independent thumb portion, and user convenience may be improved. Also, air permeability/ventilation of the glove may be improved. In addition, the fixing structure does not cover the wrist, the movement of the wrist does not affect the sensor signals.

In addition, a first binding portion 442 and a second binding portion 443 are formed at opposite sides of the opening 441 of the lower outside skin pattern 440 of the glove formed as above, and thus, the glove may be fixed onto the hand of the user. The first binding portion 442 and the second binding portion 443 may include, for example, a hook-and-loop fastener, etc. As described above, the first binding portion 442 and the second binding portion 443 are formed to form a structure, in which the glove is wound from the thumb side, and thus, an effect of preventing the sensor from being twisted may be obtained.

Here, FIG. 14 shows that the lower outside skin pattern 440 is formed as one piece (that is, integrally formed), but the concept of the present disclosure is not limited thereto, that is, the lower outside skin pattern 440 may be formed as a plurality of pieces. For example, the lower outside skin pattern 440 may have four pieces, e.g., a lower outside skin pattern, a lower outside skin pattern thumb portion, a first binding portion, and a second binding portion.

Here, the upper outside skin pattern 430 of the glove and the lower outside skin pattern 440 of the glove may include materials having different elongation rates from each other. In detail, the upper outside skin pattern 430 of the glove may include a material having high elongation rate such as span, and side surface portions of the fingers and the lower outside skin pattern 440 of the glove may include a material having low elongation rate such as suede. In particular, the side portions of the fingers may include a mesh material in consideration of air permeability, moisture permeability, etc.

As described above, the upper outside skin pattern 430 of the glove includes the material having high elongation rate, and thus, resistance force during bending the fingers may be minimized and the tension of the sensor may be maximized. At the same time, the side portions of the fingers and the lower outside skin pattern 440 of the glove include the material having low elongation rate to maintain the shape of the glove and to improve easiness in wearing the glove, and the tension generated when the fingers are bent is concentrated onto the sensor units 120 of the soft sensor attached to the upper inside skin pattern 410 of the glove and high signal level may be secured.

In addition, a certain elastic member 460 may be further provided on the back of the hand in the soft sensor embedded glove 400. In detail, in the glove of the related art, the sensor may not be sufficiently tensioned due to a difference between locations of the joint and the sensor. Also, the sensor locations on the hand vary depending on each person, and in particular, it is not easy to tension a metacarpophalangeal (MCP) joint sensor. To address this, the elastic member 460 may be further provided on a region of the MCP joint. As described above, when the elastic member 460 is provided on the region of the MCP region, the sensor may be sufficiently tensioned and the sensing may be performed even when there is a difference between positions of the joint and the sensor. Here, the elastic member 460 may include a fluffy EVA material, etc.

Here, in order to insert the elastic member 460 into the back of the hand of the soft sensor embedded glove 400, an elastic member attachment guide (not shown) may be separately provided. That is, the soft sensor embedded glove 400 is fixed on a glove fixing guide (not shown) that includes a hard material such as acryl, etc. and has the opening having a shape corresponding to the soft sensor embedded glove 400 formed therein. Next, the elastic member attachment guide (not shown) that includes a hard material such as acryl, etc. and has an opening having a shape corresponding to the elastic member 460 formed therein is located above the glove. In this status, the elastic member 460 may be attached to the upper inside skin pattern 410 of the soft sensor embedded glove 400.

Here, the elastic member 460 and the upper inside skin pattern 410 may be coupled to each other via silicone, other adhesives, etc., or via sewing. When the elastic member 460 and the upper inside skin pattern 410 are coupled to each other by sewing, the elastic member 460 and the upper inside skin pattern 410 may be coupled to each other by sewing before the soft sensor module 200 is coupled to the upper inside skin pattern 410. In addition, when the elastic member 460 and the upper inside skin pattern 410 are coupled to each other via silicone, other adhesives, etc., the elastic member 460 and the upper inside skin pattern 410 may be coupled to each other any time before or after the soft sensor module 200 is coupled to the upper inside skin pattern 410 of the glove. Alternatively, the elastic member 460 may be additionally attached to the upper inside skin pattern 410 after finishing the manufacturing of the soft sensor embedded glove 400.

As described above, when the elastic member 460 and the upper inside skin pattern 410 of the glove are coupled to each other by using the glove fixing guide (not shown) and the elastic member attachment guide (not shown), the elastic member 460 may be attached to a fixed position. Thus, the operator does not need to be skilled, and convenience in attaching the elastic member 460 may be improved.

Figure 15:
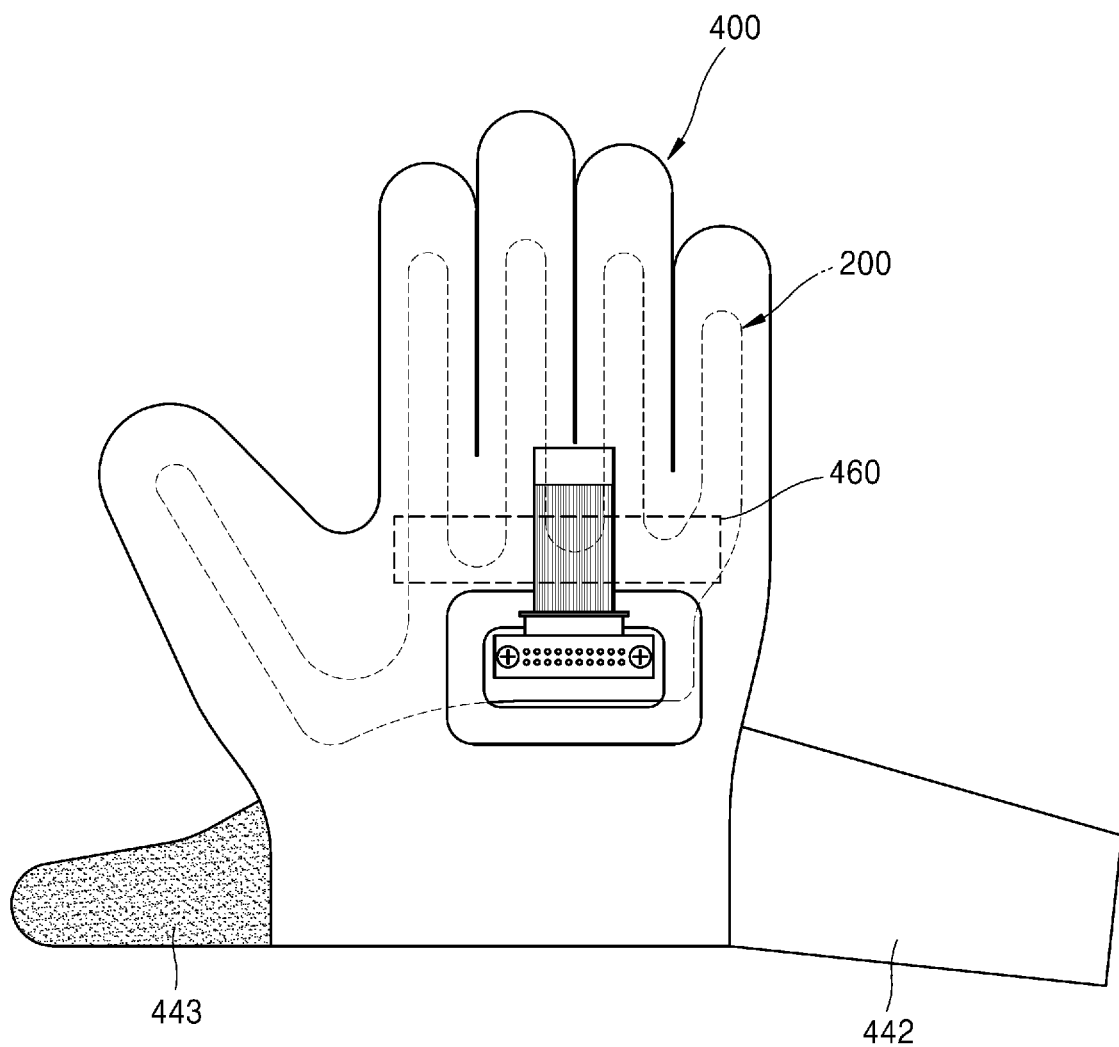

In this state, the glove is turned over, and then, post-processes such as assembling and connecting of the connector are performed. Then, as shown in FIG. 15, the soft sensor embedded glove 400 is completed. That is, in the state as shown in FIG. 14, the inside skin of the glove is exposed outside and the outside skin of the glove is located inside. The glove is turned over from the above state, such that the inside skin of the glove is located inside the glove and the outside skin of the glove is exposed to the outside.

As described above, the soft sensor embedded glove 400 according to the embodiment of the present disclosure has the soft sensor module 200 coupled to or built in the glove, that is, the inside skin of the glove. As described above, when the soft sensor module 200 is coupled to the inside of the glove, that is, the inside skin of the glove, the soft sensor may be built in the glove to be protected by the glove, and thereby improving durability of the soft sensor module 200. In addition, because a kind of patterning method is used, that is, a position of the glove is fixed by using a position fixing guide and the soft sensor module 200 is attached thereto by using a guide, working difficulty may be reduced, and mass sewing of the gloves may be performed after attaching the soft sensor modules 200 to mass amount of patterns to improve productivity. Moreover, because the soft sensor module 200 is formed in the glove, no trace of an adhesive that is used to attach the soft sensor module 200 is visible, and thus, aesthetic effect may be improved. Also, according to the soft sensor embedded glove 400 of the embodiment of the present disclosure, structures of the components in the glove may be changed and the materials of the glove may be differently applied, and thus, the resistance force generated during wearing of the glove may be reduced. In addition, the tension is concentrated onto the sensor unit to increase a size coverage range to reduce pain of the fingertip, and the size of the sensor signal may be increased. In addition, the outside skin material having high elongation rate is used, the palm portion of the glove is removed, and the opening is formed in the existing glove. Thus, the resistance force is reduced during wearing the glove, and an effect of making it easy to wear may be obtained. Also, due to the inside skin having thin sensor portions and having reduced finger lengths from the existing inside skin, the tension may be concentrated onto the sensor portion and the size of the sensor signal may be increased.

FIGS. 16A to 17L are diagrams illustrating a method of manufacturing a hand wearable device having a soft sensor according to an embodiment of the present disclosure. Here, the method of manufacturing the hand wearable device according to the embodiment of the present disclosure will be described with reference to FIG. 16A to 16F that is a schematic diagram, and then, will be described in more detail with reference to FIG. 17A to 17L.

Figure 16A:
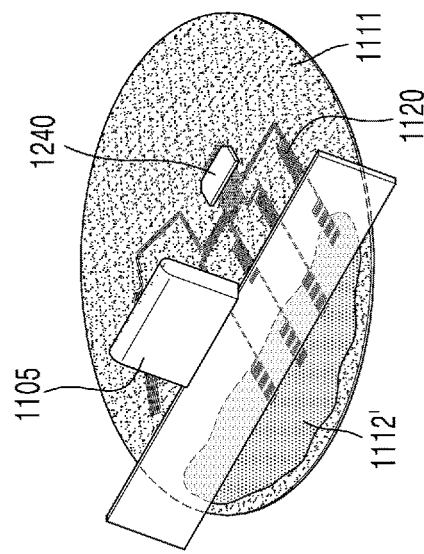
FIGS. 16A to 17L are diagrams illustrating a method of manufacturing a hand wearable device having a soft sensor according to an embodiment of the present disclosure.

Referring to FIG. 16A, a first elastic material 1111' is applied on a base material 1101. When a predetermined time elapses after applying the first elastic material 1111', the first elastic material 1111' is hardened and a first elastic layer 1111 is formed. Here, the first elastic layer 1111 may be formed by using the first elastic material 1111'. The first elastic material 1111' may be a non-conductive material having elasticity and flexibility. In the drawings, the first elastic layer 1111 is formed by a doctor blading method, but one or more embodiments are not limited thereto, that is, the first elastic layer 1111 may be formed by various methods such as a spin coating method, a printing method, etc.

Figure 16B:
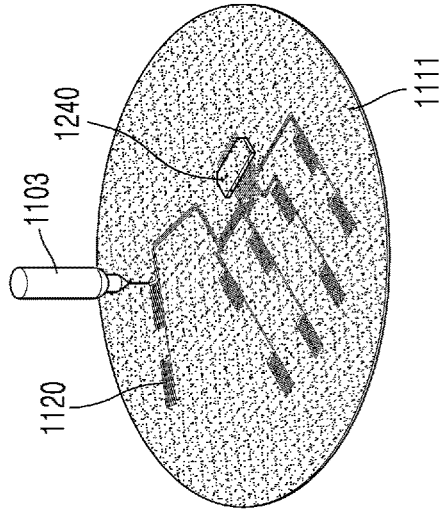

Next, referring to FIG. 16B, a conductive liquid metal is printed in a preset pattern by using a nozzle 1103 on the first elastic layer 1111 to form sensor units 1120. Here, EGaIn that is the conductive liquid metal may be in the nozzle 1103. The nozzle 1103 may print the conductive liquid metal while moving in a preset path according to a control of the three-axis controller. The three-axis controller may be a modified CNC facility or a 3D printer. The path in the three-axis direction may be set separately according to a channel pattern. Printing of the sensor units 1120 by using the nozzle 1103 will be described in detail later.

Figure 16C:
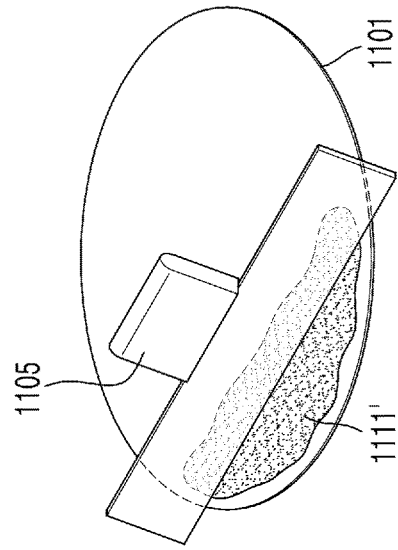

Next, referring to FIG. 16C, a second elastic material 1112' is applied on the first elastic layer 1111 on which the sensor units 1120 are formed to form a second elastic layer 1112. Here, the second elastic layer 1112 may be formed by using the second elastic material 1112'. The second elastic material 1112' may be a non-conductive material having elasticity and flexibility, for example, may be the same as the first elastic material 1111'. However, the present disclosure is not limited thereto, that is, in another embodiment, the second elastic layer 1112 and the first elastic layer 1111 may include different materials from each other.

For example, the second elastic layer 1112 may include a silicon material having viscosity like in a third elastic layer 1113 that will be described later. In this case, the hand wearable device may not include an additional third elastic layer 1113, but instead, the soft sensor may be formed, and at the same time, attaching of a fabric member 1115 may be performed only by using the second elastic layer 1112. However, for convenience of description, a case in which the hand wearable device further includes the third elastic layer having viscosity will be described hereinafter.

In the drawings, the second elastic layer 1112 is formed by a doctor blading method, but one or more embodiments are not limited thereto, that is, the second elastic layer 1112 may be formed by various methods such as a spin coating method, a printing method, etc.

Here, the conductive liquid metal of the sensor unit 1120 is in the liquid phase, but a surface tension of the conductive liquid metal is very high. Thus, even when the second elastic material is applied onto the sensor unit 1120 in the liquid phase, the second elastic material and the conductive liquid metal are not mixed with each other. Therefore, the channel pattern of the sensor unit 1120 may be covered by the second elastic material 1112' while maintaining the shape thereof.

Figure 16D:
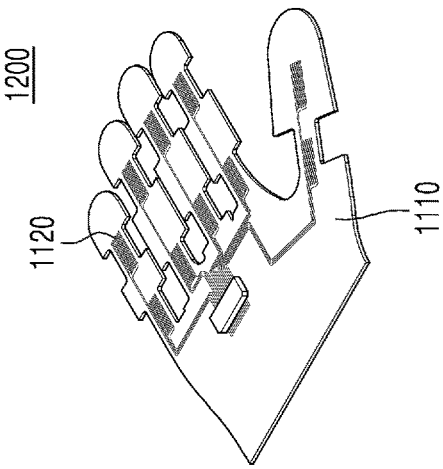

Next, referring to FIG. 16D, a third elastic material 1113' is applied onto the second elastic layer 1112 to form the third elastic layer 1113. Here, the third elastic layer 1113 may include a material having higher viscosity and higher tackiness than those of the first elastic layer 1111 and the second elastic layer 1112. The third elastic material 1113' may include an adhesive material, for example, a silicone material having tackiness that varies due to a thermosetting or ultraviolet (UV) curing process. In the drawings, the third elastic layer 1113 is formed by a doctor blading method, but the concept of the present disclosure is not limited thereto, that is, the third elastic layer 1113 may be formed by various methods such as a spin coating method, a printing method, etc. Also, although not shown in the drawings, the third elastic layer 1113 may be formed by applying the third elastic material 1113' on the second elastic layer 1112 and performing a thermosetting process or a UV curing process.

Figure 16E:
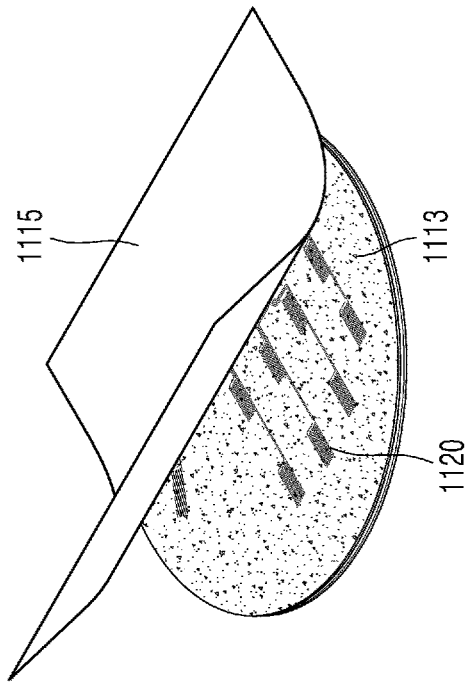

Next, referring to FIG. 16E, after applying the third elastic material 1113', the fabric member 1115 may be arranged on the third elastic material 1113'. After that, the thermosetting process or the UV process is performed on the third elastic material 1113' to form the third elastic layer 1113 having tackiness. As such, according to the method of manufacturing the hand wearable device, a disc sheet 1110 including the first to third elastic layers 1111, 1112, and 1113 and the fabric member 1115. Here, the fabric member 1115 may include any kind of material that facilitates the wearing of the hand wearable device on the user's hand without compromising the sensing power of the sensor units 1120, for example, fabric, synthetic fiber, or leather fabric. In an embodiment, the fabric member 1115 may include a spandex material made of synthetic fibers.

Figure 16F:
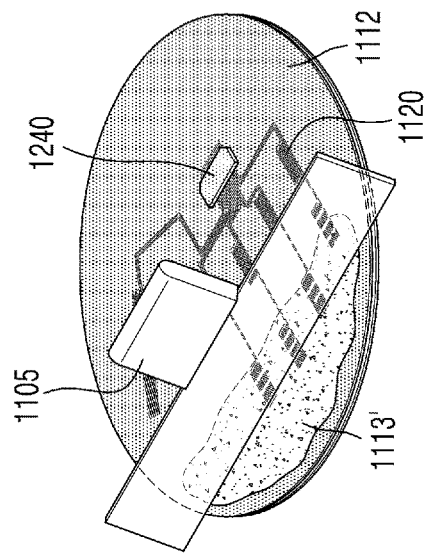

Next, referring to FIG. 16F, a remaining part of the disc sheet 1110 other than the portions on which the sensor units 1120 are formed is cut into a shape suitable for a wearing portion to manufacture the hand wearable device 1200. The hand wearable device 1200 according to an embodiment of the present disclosure may be manufactured to be mounted on a wearing portion of the user. For example, the hand wearable device 1200 may be manufactured as a glove by coupling the disc sheet 1110 that is cut into the shape of the user's hand to another sheet, as shown in the drawings.

The method of manufacturing the hand wearable device according to the embodiment of the present disclosure will be described in more detail below with reference to FIG. 17A to 17L. Hereinafter, redundant descriptions will be omitted for convenience of description.

Figure 17A:
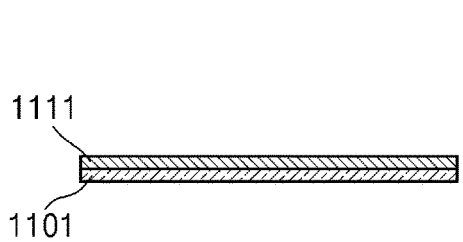

Referring to FIG. 17A, the first elastic material 1111' (see FIG. 16A) is applied onto the base material 1101. When a predetermined time elapses after applying the first elastic material 1111', the first elastic material 1111' is hardened and a first elastic layer 1111 is formed. Here, the base material 1101 may include a wafer.

Because the first elastic layer 1111 is very thin and highly elastic, the first elastic layer 1111 may be manufactured in various shapes and sizes and may be used after being cut to be suitable for a desired shape.

Figure 17B:
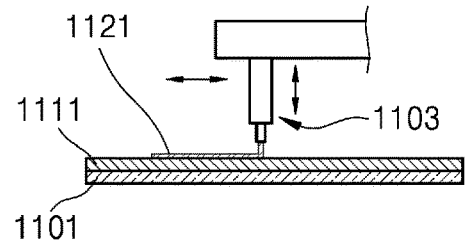

Next, referring to FIG. 17B, a conductive liquid metal is printed on the first elastic layer 1111 by using the nozzle 1103.

The nozzle 1103 may print the conductive liquid metal while moving in a preset path according to a control of the three-axis controller. The path in the three-axis direction may be set separately according to a channel pattern.

Here, the channel pattern may be designed as a desired micro-channel pattern by the user using CAD. Because the channel pattern is designed by using the CAD, the channel pattern may be easily designed in various shapes, sizes, and numbers, and may be easily modified. The shapes, sizes, and number of the channel patterns may be set according to a usage, size, etc. of the soft sensor.

After designing the channel pattern, a G code is generated by using Computer-Aided Manufacturing (CAM), corrected by using a simulator, and transferred to the three-axis controller. Therefore, the channel pattern may be easily designed and corrected by using CAD/CAM. Also, there is no need to manufacture a separate mold for forming the channel pattern.

When the conductive liquid metal is printed through the nozzle 1103, the shape, size, and characteristic of the sensor unit 1120 may be adjusted by adjusting process variables. The process variables may include an inner diameter of the nozzle 1103, a scanning pressure of the nozzle 1103, a distance between the nozzle 1103 and the first elastic layer 1111, and a transport velocity of the nozzle 1103. The desired shape and size of the sensor unit and the characteristics of the soft sensor may be adjusted by appropriately combining the process variables. The process variables may be directly set by the user or may be optimally set by a preset program.

As the inner diameter of the nozzle 1103 is reduced, a width and a height of a cross-section of the sensor unit 1120 may be reduced. In addition, the performance of the soft sensor may vary depending on the width and height of the cross-section of the sensor unit 1120. As the width and height are reduced, a sensitivity of the soft sensor increases.

The nozzle 1103 may be detachably coupled to the CNC facility to be replaceable.

Alternatively, a needle of the nozzle 1103 may be only replaced.

As a pressure of scanning the conductive liquid metal from the nozzle 1103 is increased, the width and height of the cross-section of the sensor unit 1120 increase. The pressure of the nozzle 1103 is controlled by a nozzle controller.

When the distance between the nozzle 1103 and the first elastic layer 1111 is changed, a contact area between a droplet of the conductive liquid metal, which is formed at an end of the needle in the nozzle 1103, and the first elastic layer 1111 is changed. That is, as the distance between the nozzle 1103 and the first elastic layer 1111 is reduced, a size of the droplet increases, and thus, the width of the cross-section of the sensor unit 1120 increases. The distance between the nozzle 1103 and the first elastic layer 1111 may be controlled by the three-axis controller by adjusting the height of the nozzle 1103.

As the transport velocity of the nozzle 1103 increases, the height of the cross-section of the sensor unit 1120 is reduced. The transport velocity of the nozzle 1103 is controlled by the three-axis controller.

Figure 17C:
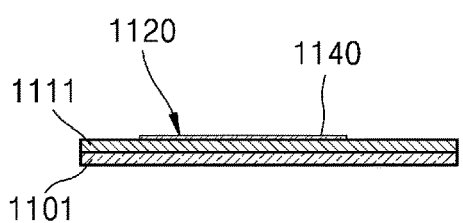

As described above, the conductive liquid metal is printed on the first elastic layer 1111 by the nozzle 1103, and the sensor unit 1120 and a wire unit 1140 are formed as shown in FIG. 17C.

Figure 17D:
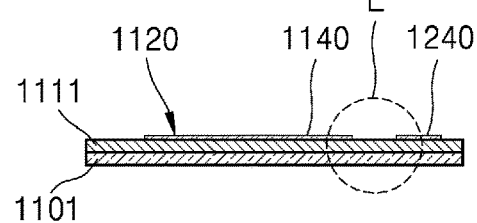

Referring to FIG. 17D, an electrode substrate 1240 is arranged at one side of the wire units 1140. At least a part of the electrode substrate 1240 may be arranged on the first elastic layer 1111, and a position thereof may be fixed by a bond, an adhesive tape, etc.

Figure 17E:
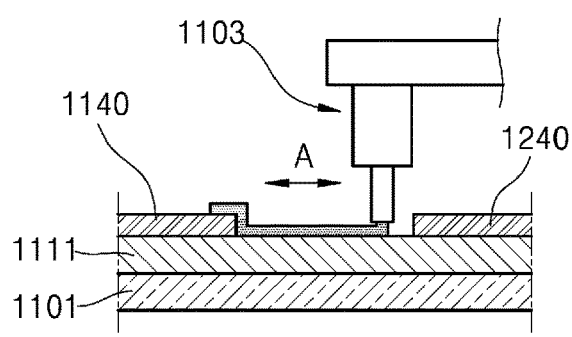
Figure 17F:
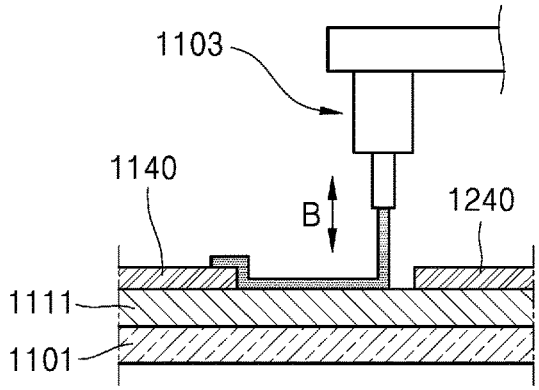

Referring to FIG. 17E, a connector 1250 connecting the wire unit 1140 to the electrode substrate 1240 is printed. The connector 1250 may be provided in or at a side of the disc sheet 1110, so as to connect the wire unit 1140 to the electrode substrate 1240.

Here, according to the method of manufacturing the hand wearable device of the embodiment, a 3D column is erected by using the property of the conductive liquid metal such as EGaIn having high structural stability and then is knocked down onto the electrode substrate 1240 to form the connector 1250. In more detail, when printing the conductive liquid metal such as EGaIn, a very thin oxide film is formed on a surface thereof. That is, the inside is in a liquid phase, but a thin film is formed on the outside. Thus, the liquid inside may be deformed to some extent. Therefore, a process of lifting the conductive liquid metal upward may be performed owing to the external oxide film. Also, when cutting this, it may be cut by breaking the thin film. In addition, after breaking the conductive liquid metal, the oxide film is exploded and the liquid is exposed, and then, the oxide film is formed again. This will be described below in more detail.

FIG. 17E is an enlarged view of portion E in FIG. 17D. First, as shown in FIG. 17E, the nozzle 1103 prints the conductive liquid metal while moving a certain distance from an end portion of the wire unit 1140 in a first direction (A direction). Accordingly, the connector 1250 is partially formed and covers an end portion of the wire unit 1140.

As described above, in a state in which the nozzle 1103 prints the conductive liquid metal while moving to vicinity of the electrode substrate 1240, the nozzle 1103 erects the conductive liquid metal in a vertical direction while moving in a second direction (B direction), that is, in a vertical direction in the diagram, as shown in FIG. 16F. In detail, the conductive liquid metal such as EGaIn has high viscosity and structural stability, and thus, may be erected vertically to a certain height. According to the above property, the conductive liquid metal is continuously injected while moving the nozzle 1103 in the vertical direction, such that the connector 1250 formed of the conductive liquid metal may be erected in the vertical direction. Here, the connector 1250 may be vertically erected to a height that is sufficient to cover the end portion of the electrode substrate 1240 when it falls.

Figure 17G:
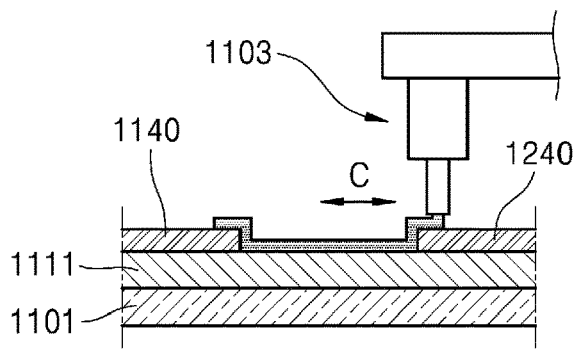
Figure 17H:
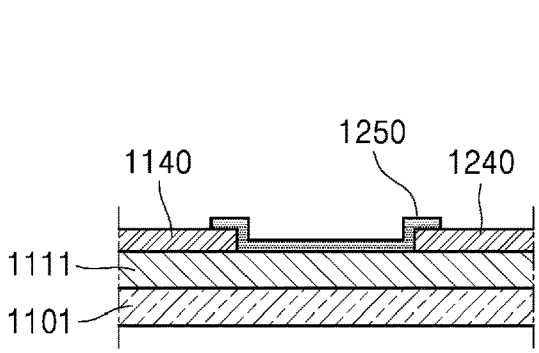

As described above, when the connector 1250 may be erected to a sufficient height, as shown in FIG. 17G, the nozzle 1103 may be moved in a C direction and the end portion of the connector 1250 connected to the nozzle 1103 is seated on a connecting portion on the electrode substrate 1240. That is, as described above, the connector 1250 is formed to a height that is sufficient to cover the end portion of the electrode substrate 1240, and thus, when the connector 1250 completely falls down, the connector 1250 covers one end portion of the electrode substrate 1240. Next, when the end portion of the connector 1250 connected to the nozzle 1103 is cut by a vacuum pressure, as shown in FIG. 17H, the connector 1250 is formed so that one end portion covers one end portion of the wire unit 1140 and the opposite end covers one end portion of the electrode substrate 1240, and thus, the connector 1250 may electrically connects the wire unit 1140 to the electrode substrate 1240.

Figure 17I:
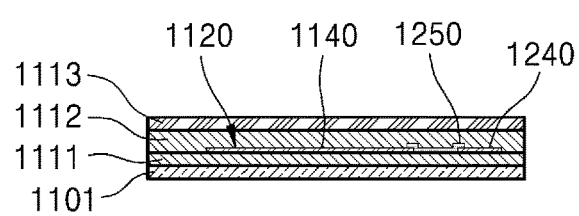

Next, referring to FIG. 17I, the second elastic material 1112' (see FIG. 16C) is applied onto the first elastic layer 1111, on which the sensor unit 1120, the wire unit 1140, the connector 1250, etc. are formed, to form the second elastic layer 1112. After that, the third elastic material 1113' (see FIG. 16D) is applied onto the second elastic layer 1112 to form the third elastic layer 1113.

Figure 17J:
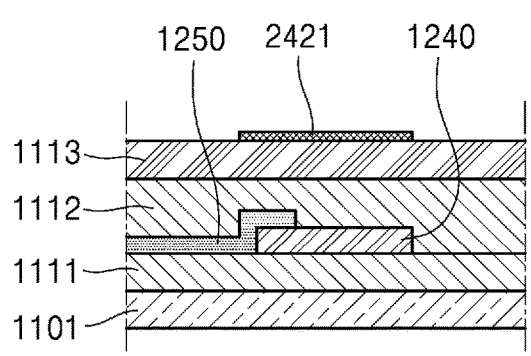

FIG. 17J is an enlarged view of portion J in FIG. 17I. As shown in FIG. 17J, in a state in which the electrode substrate 1240 and the connector 1250 are embedded in the second elastic layer 1112, a first reinforcing portion 2421 supporting at least a part of the connector 1250 and at least a part of the electrode substrate 1240 is formed on the third elastic layer 1113. Here, the first reinforcing portion 2421 may be formed of a non-elastic film, etc. on the third elastic layer 1113 in order to support at least a region where the connector 1250 and the electrode substrate 1240 overlap each other.

In other words, a region where the connector 1250 formed of the conductive liquid metal and the electrode substrate 1240 overlap each other may easily break due to an external pressure or external shock due to heterogeneous materials. In particular, because the conductive liquid metal aggregates in the form of a large droplet and rises from the connector 1250, a thickness of the silicone layer corresponding to the upper portion of the connector 1250 is reduced. Thus, when a pressure from a sharp material is locally applied to the overlapping region, the damage may become severe. The first reinforcing portion 2421 is formed of a material having a hardness greater than that of the first elastic layer 1111 or the second elastic layer 1112 so as to disperse the external pressure or shock described above.

The first reinforcing portion 2421 may be formed by attaching a non-elastic film onto the third elastic layer 1113. Here, the first reinforcing portion 2421 may be arranged on the third elastic material 1113' before the tackiness of the third elastic material 1113' is implemented. The third elastic material 1113' may be changed into the third elastic layer 1113 having the tackiness through the thermosetting process or the UV curing process. In the embodiment of the present disclosure, the first reinforcing portion 2421 and the fabric member 1115 are arranged after applying the third elastic material 1113', and then, the curing process is performed to express the tackiness of the third elastic material 1113'. Alternatively, the first reinforcing portion 2421 may be formed by applying a material on the third elastic layer 1113, wherein the material may be bonded to silicone. For example, the first reinforcing portion 2421 may be formed by applying a silicone material expressing the tackiness on the third elastic layer 1113.

Figure 17K:
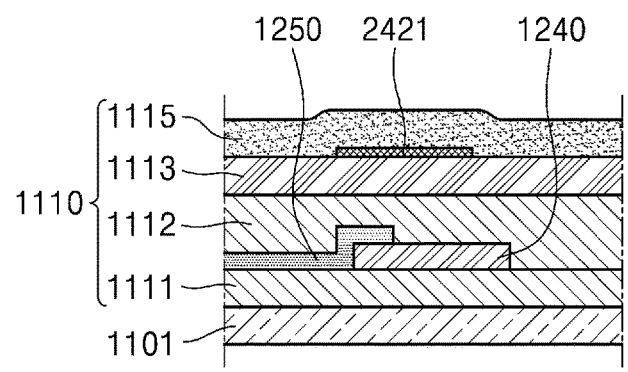

Next, referring to FIG. 17K, the fabric member 1115 is attached to the third elastic layer 1113 on which the first reinforcing portion 2421 is formed, to manufacture the disc sheet 1110 including the first to third elastic layers 1111 to 1113 and the fabric member 1115. Because the third elastic layer 1113 has the tackiness, the fabric member 1115 may be coupled to the soft sensor including the first elastic layer 1111, the second elastic layer 1112, and the sensor unit 1120. Here, it may be difficult to attach the fabric member 1115 onto the third elastic layer 1113 corresponding to the first reinforcing portion 2421 due to the arrangement of the first reinforcing portion 2421, but the fabric member 1115 may be stably coupled to the third elastic layer 1113 through the attachment to the region except for the first reinforcing portion 2421. Alternatively, in another embodiment, the method of manufacturing the hand wearable device may attach the fabric member 1115 by adding a process of applying an adhesive onto the first reinforcing portion 2421.

Figure 17L:
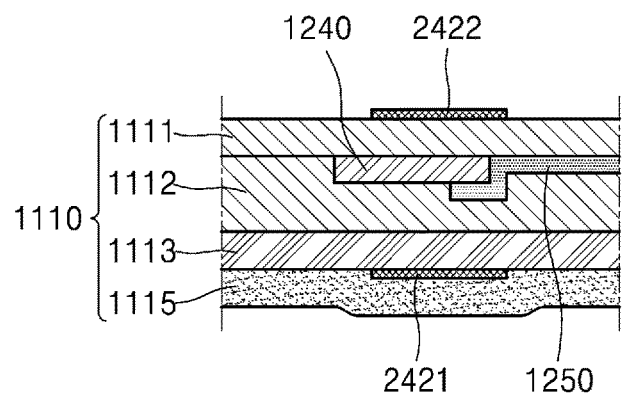

Next, referring to FIG. 17L, after fabricating the disc sheet 1110, the disc sheet 1110 is separated from the base material 1101. After that, the disc sheet 110 is turned over and a second reinforcing portion 2422 may be formed on the first elastic layer 1111. In other words, like the first reinforcing portion 2421, the second reinforcing portion 2422 may support at least a part of the connector 1250 and at least a part of the electrode substrate 1240. The second reinforcing portion 2422 may be arranged on the first elastic layer 1111 at a location corresponding to the first reinforcing portion 2421, and may have the same size and the same shape as those of the first reinforcing portion 2421, but is not limited thereto.

The second reinforcing portion 2422 may be formed of a non-elastic film that is the same as that of the first reinforcing portion 2421. Here, the first elastic layer 1111 may be coupled to the second reinforcing portion 2422 by using a bond, etc. Although not shown in the drawings, before attaching the second reinforcing portion 2422 to the first elastic layer 1111, a silicone layer may be further applied on a region corresponding to the second reinforcing portion 2422. It is because, when the second reinforcing portion 2422 formed of the non-elastic film is directly attached to a thin silicone film by using a non-elastic bond (Loctite, etc.), stress is concentrated between the non-elastic portion and the elastic portion and the stressed portion may be easily torn.

Next, a remaining part of the manufactured disc sheet 1110 other than the portions on which the sensor units 1120 are formed is cut into a shape suitable for a wearing portion to manufacture the hand wearable device 1200. Here, because the disc sheet 1110 is integrally formed with the fabric member 1115, the first elastic layer 1111, and the second elastic layer 1112, the disc sheet 1110 may be cut into the same shape during cutting process. Therefore, according to the method of manufacturing the hand wearable device according to the embodiment of the present disclosure, two cutting processes of cutting the fabric member 1115 and separately cutting the elastic sheet including the first elastic layer 1111 and the second elastic layer 1112 may be changed into one cutting process, and thus, processing efficiency may be improved.

Figure 18:
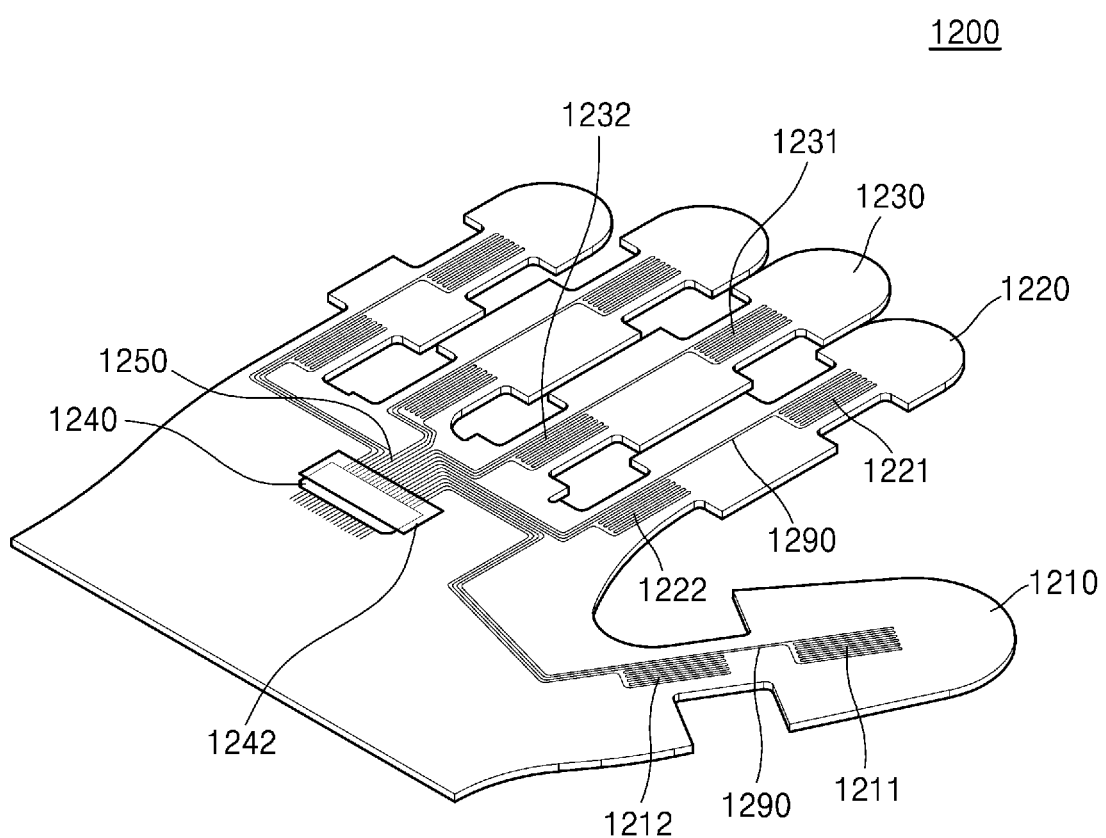
FIG. 18 is a plan view of a hand wearable device including the soft sensor of FIG. 16.

FIG. 18 is a plan view of a hand wearable device including the soft sensor of FIG. 16A to 16F, and FIG. 19 is a plan view showing that the hand wearable device of FIG. 18 is worn on the hand.

Figure 19:
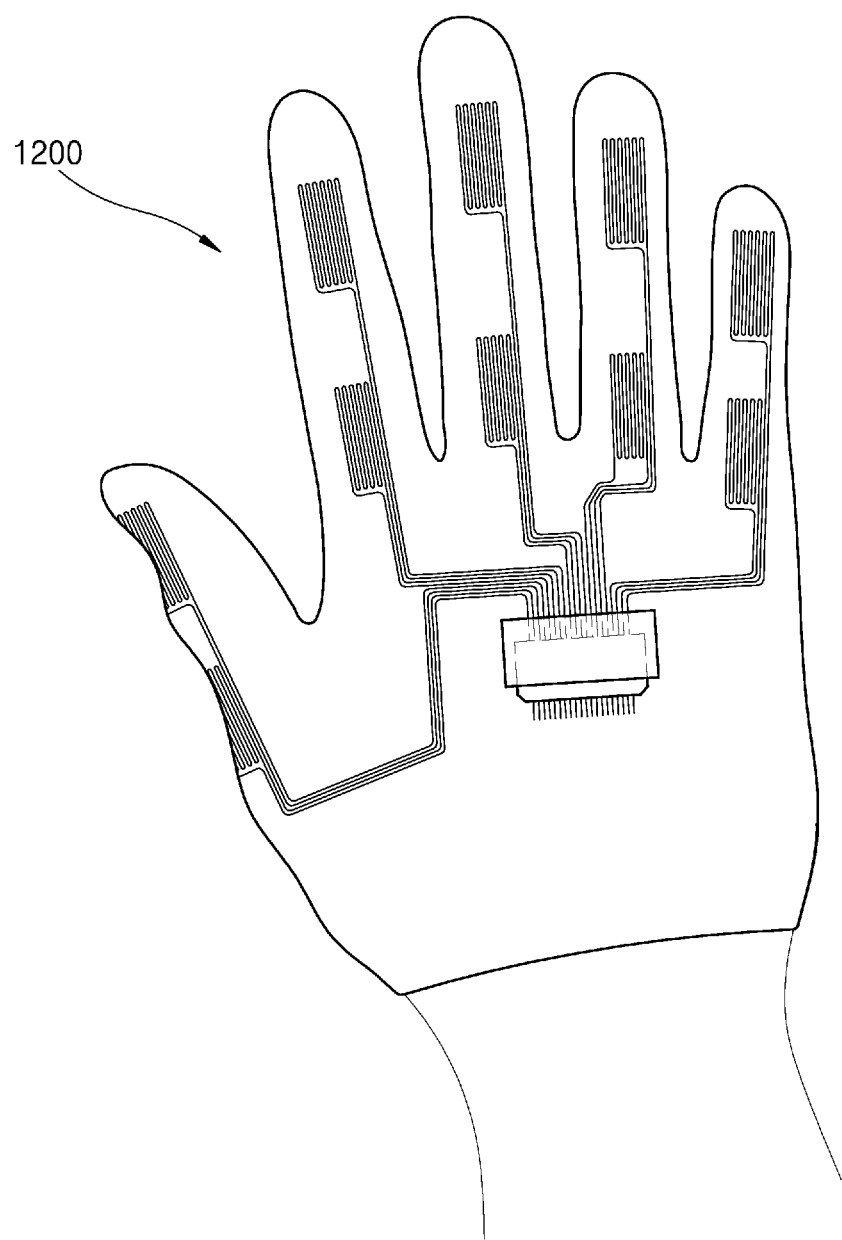
FIG. 19 is a plan view showing a state in which the hand wearable device of FIG. 18 is worn on a hand.

Referring to FIGS. 18 and 19, the hand wearable device 1200 may include a sheet formed of an elastic material, on which a plurality of soft sensors 100 corresponding respectively to joints of fingers are formed. Here, the hand wearable device 1200 may be formed to have a shape corresponding to at least a part of shape of a hand. In the embodiment, the hand wearable device 1200 may be formed as a glove worn on the hand, by using the disc sheet 1110 in which the soft sensors 100 and the fabric member 1115 are integrally formed. In the drawings, the shape obtained by cutting the disc sheet 1110 according to the shape of a wearing portion is shown, but the hand wearable device 1200 may be formed as a glove by cutting and sewing another fabric member identically or similarly to the cut disc sheet 1110.

In addition, the hand wearable device 1200 shown in the drawings is shown as a glove corresponding to all fingers, but the present disclosure is not limited thereto, that is, the hand wearable device 1200 may have a minimum shape that is necessary for implementing the sensors. The hand wearable device 1200 may be formed by forming the disc sheet 1110 in a circular or square shape that is larger than a desired shape, and then cutting the disc sheet 1110 into the desired shape by laser cutting process. That is, in the disc sheet 1110, other regions than the portions where the plurality of sensor units 1120 are formed may be used after being cut into a shape suitable for a wearing portion such as a finger. The plurality of sensor units 1120 may be located at joints of the fingers for sensing movements of the fingers.

The hand wearable device 1200 of FIGS. 18 and 19 will be described in more detail below.

The hand wearable device 1200 includes a thumb sensing unit 1210, an index finger sensing unit 1220, and a middle finger sensing unit 1230. In addition, the hand wearable device 1200 may further include a ring finger sensing unit and a little finger sensing unit.

Also, the hand wearable device 1200 may further include a first adduction/abduction measurement sensor (not shown) formed between the thumb sensing unit 1210 and the index finger sensing unit 1220, and a second adduction/abduction measurement sensor (not shown) formed between the index finger sensing unit 1220 and the middle finger sensing unit 1230. In addition, the hand wearable device 1200 includes a third adduction/abduction measurement sensor (not shown) formed on a side surface of the index finger sensing unit 1220 to measure the adduction/abduction of the index finger.

Although not shown in the drawings, the hand wearable device 1200 may further include a fourth adduction/abduction measurement sensor (not shown) formed between the middle finger sensing unit 1230 and a ring finger sensing unit (not shown), and a fifth adduction/abduction measurement sensor (not shown) formed between the ring finger sensing unit (not shown) and the little finger sensing unit (not shown).

The thumb sensing unit 1210 may include a first thumb part sensor 1211 and a second thumb part sensor 1212. The first thumb part sensor 1211 may measure flexion and extension between a distal phalanx and a proximal phalanx of the thumb. The second thumb part sensor 1212 may measure flexion and extension between the proximal phalanx and metacarpals of the thumb. Although not shown in the drawings, the thumb sensing unit 1210 may further include a third thumb part sensor (not shown) for measuring flexion and extension of the thumb between the metacarpals and carpals.

The index finger sensing unit 1220 may include a first index finger part sensor 1221 and a second index finger part sensor 1222. The first index finger part sensor 1221 may measure flexion and extension between a middle phalanx and a proximal phalanx of the index finger. The second index finger part sensor 1222 may measure flexion and extension between the proximal phalanx and metacarpals of the index finger.

The middle finger sensing unit 1230 may include a first middle finger part sensor 1231 and a second middle finger part sensor 1232. The first middle finger part sensor 1231 may measure flexion and extension between a middle phalanx and a proximal phalanx of the middle finger. The second middle finger part sensor 1232 may measure flexion and extension between the proximal phalanx and metacarpals of the middle finger.

In addition, the ring finger sensing unit (not shown) may include a first ring finger part sensor and a second ring finger part sensor, and the little finger sensing unit (not shown) may further include a first little finger part sensor and a second little finger part sensor.

The first adduction/abduction measurement sensor (not shown) is provided between the thumb sensing unit 1210 and the index finger sensing unit 1220 to measure the adduction and abduction of the thumb.

The second adduction/abduction measurement sensor (not shown) is provided between the index finger sensing unit 1220 and the middle finger sensing unit 1230 to measure the adduction and abduction of the middle finger.

The third adduction/abduction measurement sensor (not shown) is formed at a side of the index finger sensing unit 1220 to measure the adduction and abduction of the index finger.

Here, the hand wearable device 1200 according to an embodiment of the present disclosure further includes a third adduction/abduction measurement sensor (not shown) at a side of the index finger in order to separate a signal from the adduction/abduction measurement sensor from a signal from a flexion and extension measurement sensor. That is, the third adduction/abduction measurement sensor (not shown) is additionally provided at a side of the index finger so as to independently measure the adduction/abduction of the index finger and the middle finger.

Here, the first thumb part sensor 1211, the second thumb part sensor 1212, the first index finger part sensor 1221, the second index finger part sensor 1222, the first middle finger part sensor 1231, the second middle finger part sensor 1232, the first adduction/abduction measurement sensor (not shown), the second adduction/abduction measurement sensor (not shown), and the third adduction/abduction measurement sensor (not shown) may each be the sensor unit 1120 in the soft sensor 100 of FIG. 17. Also, a wire unit 1290 extending from each of the sensors 1211, 1212, 1221, 1222, 1131, and 1232 may be the wire unit 1140 in the soft sensor of FIG. 17.

Here, in the hand wearable device 1200 according to an embodiment of the present disclosure, a plurality of channel patterns respectively corresponding to joints of fingers having different lengths and shapes may be integrally designed with one hand wearable device by using CAD. That is, because the channel patterns are designed by using CAD in the present disclosure, it is easy to design the plurality of channel patterns at once.

As described above, because the plurality of sensor units 1120 may be formed at once by using 3D printing, etc., a large-sized sensor may be easily manufactured. Also, a mold for forming the plurality of channel patterns is not necessary, and thus, the manufacturing processes may be simplified and manufacturing costs may be reduced.

In the drawings, the hand wearable device worn on three fingers, that is, thumb, index finger, and middle finger, and soft sensors arranged on the hand wearable device are shown, but one or more embodiments of the present disclosure are not limited thereto. That is, soft sensors corresponding to all of five fingers or some of the fingers may be arranged on the hand wearable device, or some of the soft sensors may be added or omitted in each of the fingers.

Because the soft sensor according to the present disclosure has no limitation in a size thereof, has a very small thickness, and has elasticity, the sensor units 1120 of various numbers and shapes may be formed. Thus, the soft sensor may be applied to joints such as shoulders, ankles, wrists, and fingers having various sizes and complicated movements.

In addition, although not shown in the drawings, the hand wearable device 1200 may further include a chip. The chip may be inserted into a location, in the disc sheet 1110, corresponding to a wrist. The chip may be inserted by an insert printing method. The chip may include an FPCB, a motor driver, a micro-control unit, a wireless communication unit, etc.

In addition, although not shown in the drawings, the hand wearable device 1200 may further include a finger wearing unit and a wrist wearing unit. The finger wearing unit and the wrist wearing unit may be separately manufactured from the disc sheet 1110 and then attached to the disc sheet, or may be integrally formed with the disc sheet 1110.

Here, the hand wearable device 1200 according to the embodiment of the present disclosure further includes the electrode substrate 1240 and the connector 1250.

In the hand wearable device according to the related art, a surface of the soft sensor is partially cut so that the cross-section of the channel may be exposed, and then, a wire is directly inserted. Then, the wire is fixed by using a bond and a non-elastic film in order to prevent the wire from falling out. However, according to the related art, as the soft sensor has a small thickness and is formed of a soft material, the difficulty in the electrode insertion increases. Moreover, the operator needs to do a direct connecting operation, and thus, automation may not be achieved. In addition, when there are a plurality of channels, it takes a long time period for performing the work.

To address the above issues, the hand wearable device 1200 according to the embodiment of the present disclosure further includes the electrode substrate 1240 and the connector 1250, and thus, the soft sensor and the external electronic device may be easily connected to each other. This will be described below in more detail.

The electrode substrate 1240 is formed on the hand wearable device 1200 so as to connect an external electronic device (e.g., connector, etc.) to the soft sensors. Here, the electrode substrate 1240 may include various circuit boards such as an FPCB, etc. In addition, the electrode substrate 1240 may be in contact with or coupled to the connector, etc.

Here, the electrode substrate 1240 may be formed by an insert printing method. That is, the first elastic layer (see 1111 of FIG. 16A) is formed, and after that, the electrode substrate 1240 may be inserted onto the first elastic layer. The electrode substrate 1240 may be located on a region of the first elastic layer (see 1111 of FIG. 16A), where the electrode substrate 1240 is not interfered with the movement of the wrist and does not infiltrate into locations of the sensors 1211, 1212, 1221, 1222, 1231, and 1232. Also, the electrode substrate 1240 may be located on a region where distances between the sensors 1211, 1212, 1221, 1222, 1231, and 1232 and the electrode substrate 1240 may be minimized, in order to minimize a length of the wire unit 1290. For example, the electrode substrate 1240 may be formed on the back of the hand, which is adjacent to the wrist. For ensuring durability, a periphery of the electrode substrate 1240 may need to be reinforced with a hard material, and thus, the electrode substrate 1240 may be located at the back of the hand, not on the wrist part which flexibly moves.

The connector 1250 may connect the wire units 1140 of the soft sensor 100 to the electrode substrate 1240. The connector 1250 may include a certain conductive material, e.g., an applicable liquid or solid type conductive material. For example, the connector 1250 may be formed of the conductive liquid metal that is in a liquid phase having conductivity at room temperature. Here, the conductive liquid metal may include EGaIn as an example.

The connector 1250 may be formed in a preset pattern by using a conductive liquid metal, and the connector 1250 may be formed of a material such as EGaIn by various methods such as a 3D printing method, a nozzle printing method, an inkjet printing method, a roll-to-roll printing method, etc.

In addition, the hand wearable device 1200 may include a reinforcing portion 1242 supporting at least a part of the connector 1250 and at least a part of the electrode substrate 1240.

As described above, the reinforcing portion 1242 may be formed of a non-elastic film, etc. in order to improve durability of the connector 1250 and the electrode substrate 1240 that are electrically connected to each other. Here, the reinforcing portion 1242 may include a first reinforcing portion 2421 provided between the fabric member (see 1115 of FIG. 17K) and the connector 1250/the electrode substrate 1240 and the second reinforcing portion 2422 covering the external surface of the first elastic layer 1111.

According to the present disclosure, the soft sensor including the sensor units 1120, the first elastic layer 1111, and the second elastic layer 1112, and the fabric member 1115 are integrally formed, and thus may be cut as a shape corresponding to the wearing portion through one process. Thus, the processing efficiency may be improved.

Also, according to the method of manufacturing the hand wearable device, by coupling the fabric member 1115 to the first elastic layer 1111 and the second elastic layer 1112 including silicon material, a range of selecting the fabric member 1115 for cutting may be widened, and as such, the elongation rate and flexibility of the hand wearable device may be improved.

Figure 20:
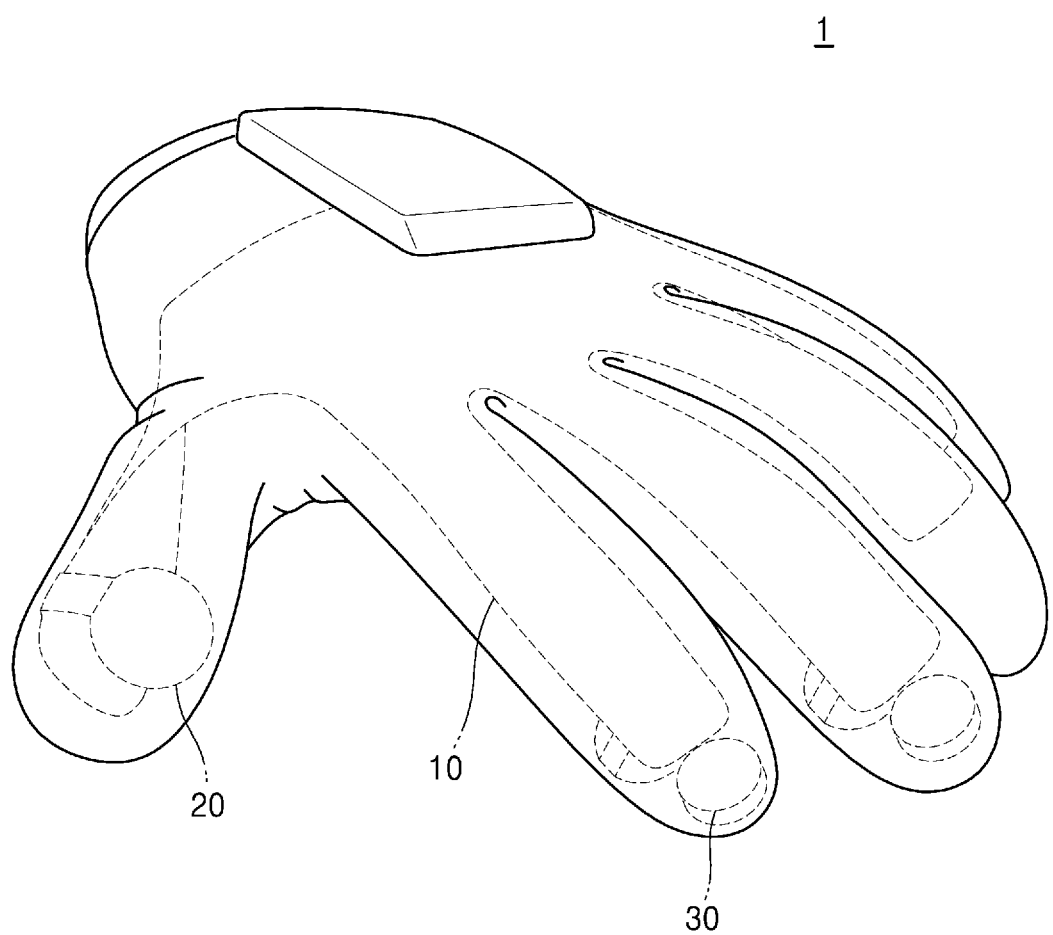
FIG. 20 is a schematic diagram of a hand wearable device according to an embodiment of the present disclosure.
Figure 21:
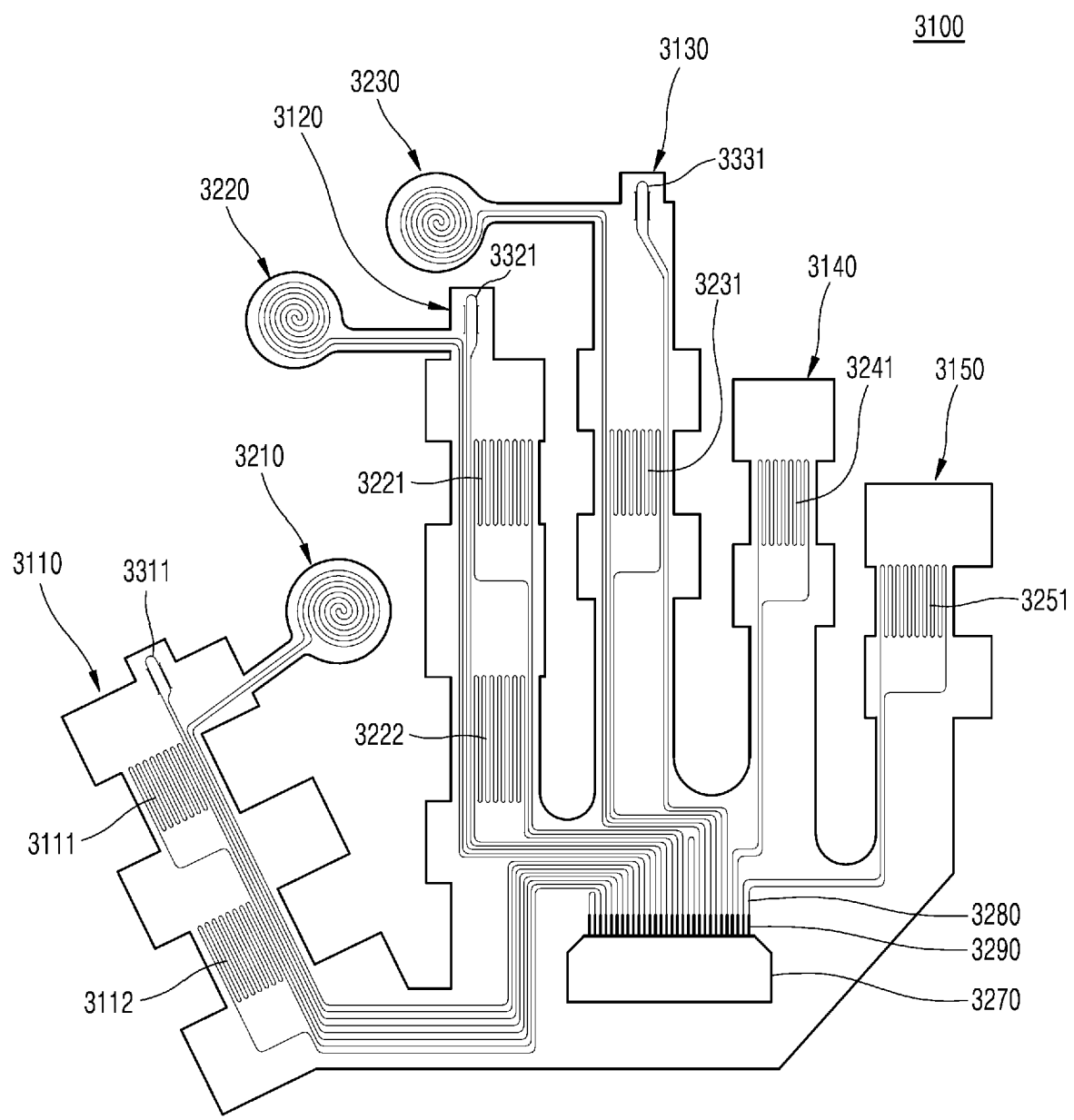
FIG. 21 is a diagram of a soft sensor module according to an embodiment of the present disclosure.

FIG. 20 is a schematic diagram of a hand wearable device 1 according to an embodiment of the present disclosure, and FIG. 21 is a diagram of a soft sensor module 3100 according to an embodiment of the present disclosure.

Referring to FIGS. 20 and 21, the hand wearable device 1 according to the embodiment of the present disclosure may include a finger movement sensing unit 10 and a pressure sensing unit 20. Also, the hand wearable device 1 may further include a vibration providing unit 30.

Here, the finger movement sensing unit 10 and the pressure sensing unit 20 according to the embodiment of the present disclosure may include soft sensors. The soft sensor according to the embodiment of the present disclosure may be used to measure an angle of a joint or to measure a pressure in virtual reality, coexistent reality, or rehabilitation field, and in particular, may be used as a unit for measuring the angle of a finger joint or measuring a pressure at a fingertip and inputting data to a virtual reality device, etc.

The finger movement sensing unit 10 may include at least one first soft sensor formed at a joint portion of a finger to measure flexion and extension of the finger. The first soft sensor may include an elastic sheet including a first elastic layer and a second elastic layer facing each other, and a first sensor unit formed by printing conductive liquid metal between the first elastic layer and the second elastic layer.

The pressure sensing unit 20 may include a second soft sensor formed at an end portion of a finger to measure a pressure applied thereto. The second soft sensor may include an elastic sheet including a first elastic layer and a second elastic layer, and a second sensor unit formed by printing conductive liquid metal between the first elastic layer and the second elastic layer.

In an embodiment, the finger movement sensing unit 10 and the pressure sensing unit 20 may respectively measure the movement of the finger and measure the pressure by using soft sensors that are separately manufactured. However, the present disclosure is not limited thereto, that is, in another embodiment, the finger movement sensing unit 10 and the pressure sensing unit 20 may be manufactured as one soft sensor module 3100 as shown in FIG. 21. Hereinafter, the soft sensor module 3100 including the finger movement sensing unit 10 and the pressure sensing unit 20 will be described below for convenience of description.

The first soft sensor of the finger movement sensing unit 10 will be described with reference to accompanying drawings.

Figure 22:
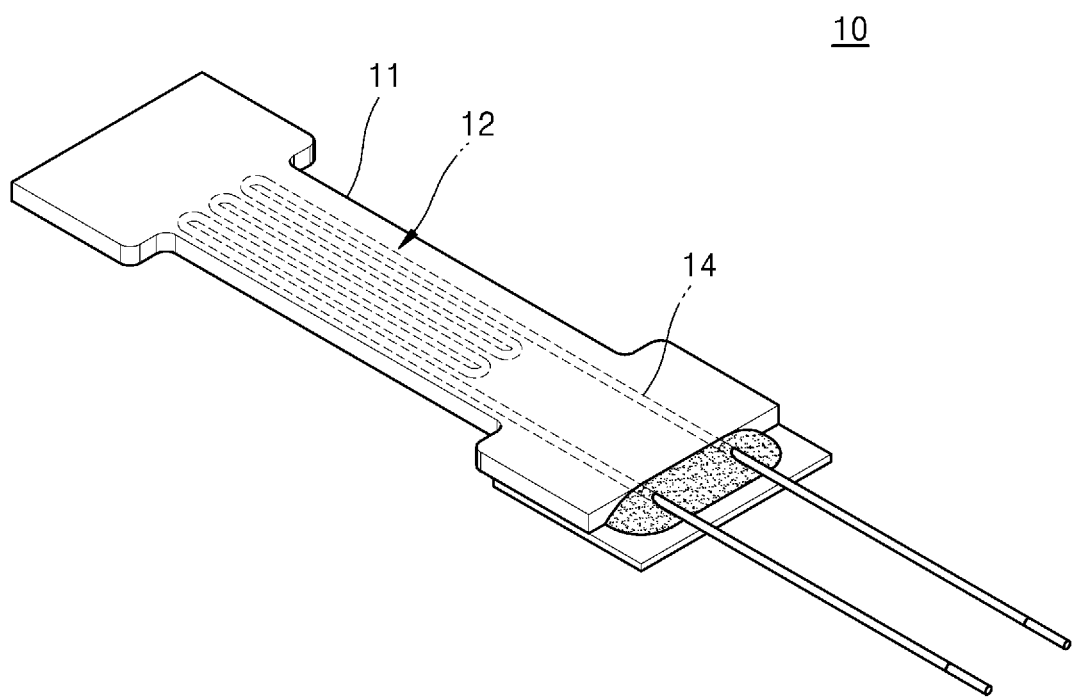
FIG. 22 is a perspective view of a first soft sensor according to an embodiment of the present disclosure.

FIG. 22 is a perspective view of a first soft sensor according to an embodiment of the present disclosure.

Referring to FIG. 22, the first soft sensor according to the embodiment of the present disclosure may include an elastic sheet 11, a first sensor unit 12, and a first wire unit 14.

The elastic sheet 11 includes a first elastic layer and a second elastic layer facing each other. The first sensor unit 12 may be formed between the first elastic layer and the second elastic layer. Here, the first sensor unit 12 may be formed as a pattern set in advance on the first elastic layer by using the conductive liquid metal. The first wire unit 14 is electrically connected to the first sensor unit 12, and may transfer an electrical signal transferred from the first sensor unit 12 to an electrode substrate (see 3270 of FIG. 21) that will be described later or a flat flexible cable (FFC). The first wire unit 14 as above may be formed by printing the conductive liquid metal on the first elastic layer or a base material by using a 3D printer, etc.

Hereinafter, the pressure sensing unit 20 according to an embodiment of the present disclosure will be described in detail with reference to accompanying drawings.

Figure 23A:
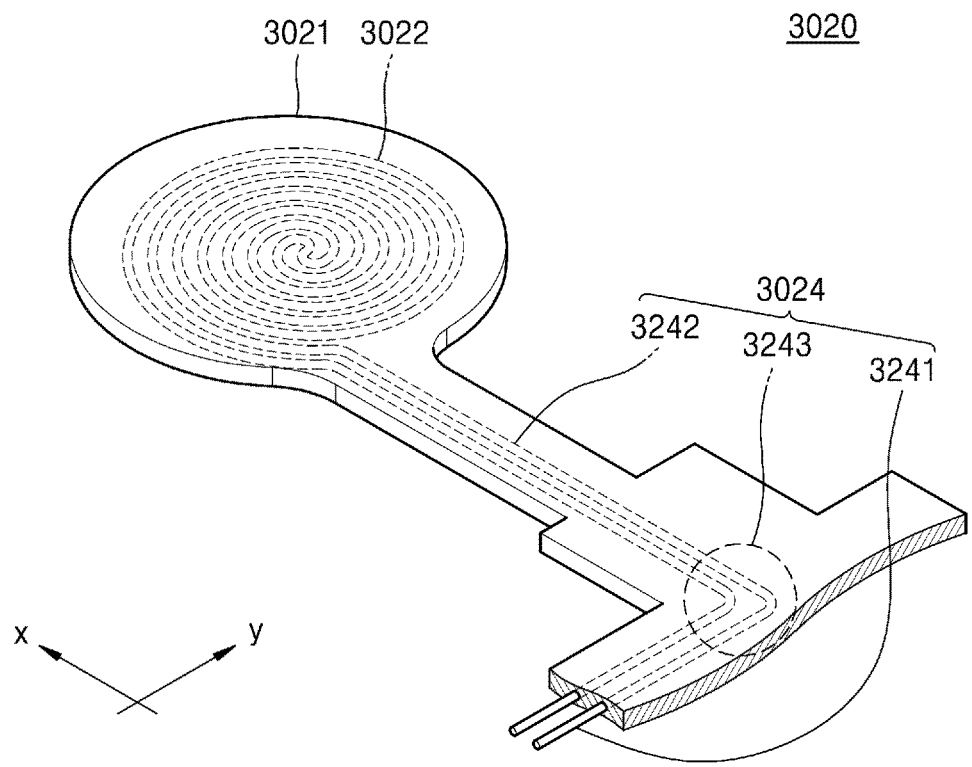
FIG. 23A is a schematic diagram of a second soft sensor in a pressure sensing unit according to an embodiment of the present disclosure.
Figure 23B:
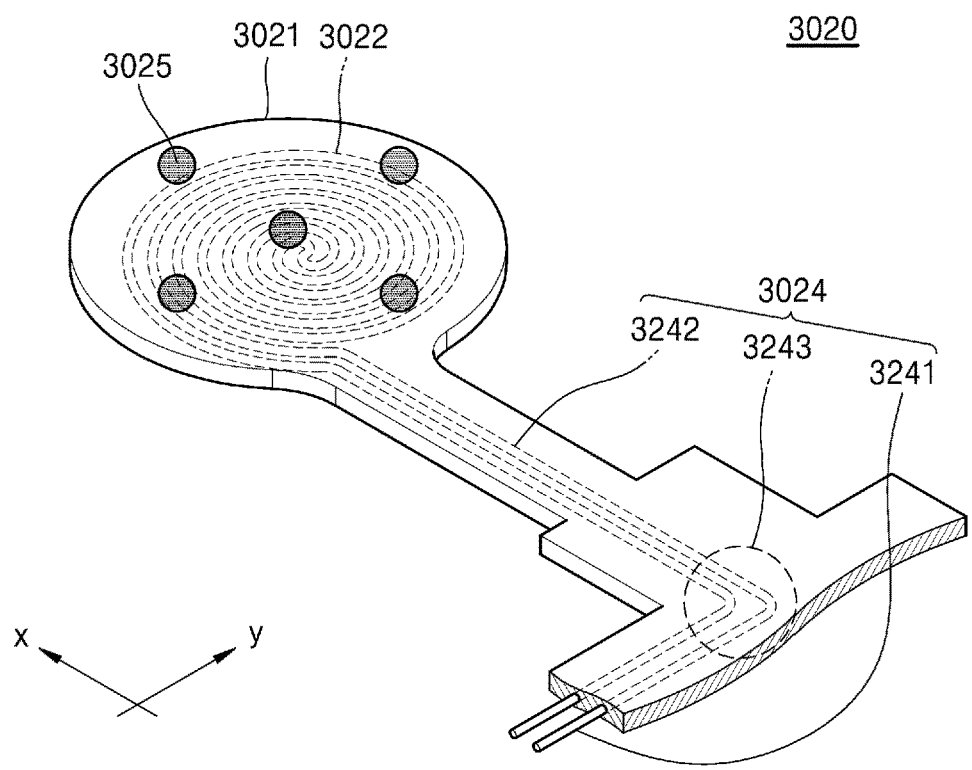
FIG. 23B is a diagram showing a second soft sensor according to another embodiment.

FIG. 23A is a schematic diagram of a second soft sensor in the pressure sensing unit 20 according to an embodiment of the present disclosure, and FIG. 23B is a diagram showing a second soft sensor according to another embodiment.

Referring to FIG. 23A, the second soft sensor according to the embodiment of the present disclosure may include an elastic sheet 3021, a second sensor unit 3022, and a second wire unit 3024.

The elastic sheet 3021 includes a first elastic layer and a second elastic layer facing each other. The elastic sheet 3021 may have the same structure and may be formed by the same manufacturing method as those of the elastic sheet 11 of the first soft sensor described above, and in an embodiment, the elastic sheet 3021 may be integrally formed with the elastic sheet 11 of the first soft sensor.

The second sensor unit 3022 may be formed between the first elastic layer and the second elastic layer. Here, the second sensor unit 3022 may be formed as a pattern set in advance on the first elastic layer by using the conductive liquid metal. For example, the second sensor unit 3022 may be formed by printing the conductive liquid metal in a spiral structure, as shown in FIG. 23A. The second sensor unit 3022 covers a region corresponding to the fingertip as the spiral structure, and thus, may accurately sense the pressure applied to the local portion. The second sensor unit 3022 may be formed through the same process as that of forming the first sensor unit 12, when the first sensor unit 12 is formed.

The second sensor unit 3022 may include a certain conductive material, e.g., an applicable liquid or solid type conductive material. For example, the second sensor unit 3022 may be formed of the conductive liquid metal that is in a liquid phase having conductivity at room temperature. Here, the conductive liquid metal may include EGaIn as an example.

The second soft sensor is provided on the surface of the hand wearable device 1, e.g., an end portion of the finger, in particular, a location corresponding to fingerprint of the finger, so as to measure an applied pressure when being pushed by the finger. The second soft sensor is a sensor for measuring the pressure, unlike the first soft sensor measuring the flexion and extension movements, and may be formed densely as a spiral structure at the end portion of the finger, unlike the first soft sensor that is elongated in the lengthwise direction of the finger. In addition, because a sensor channel is reduced due to the pressure applied to the end of the finger and resistance changes in the sensor for measuring the pressure, the applied pressure may be measured by measuring a variation in the resistance. This will be described later.

The second wire unit 3024 is electrically connected to the second sensor unit 3022, and may transfer an electrical signal transferred from the second sensor unit 3022 to an electrode substrate (see 3270 of FIG. 21) that will be described later or to an FFC. The soft sensor module 3100 may include the electrode substrate (3270 of FIG. 21), and may receive electrical signals transferred from the first wire unit 14 and the second wire unit 3024. The soft sensor module 3100 may include two or more electrode substrates as necessary, and may separately receive the electrical signals transferred from the first wire unit 14 and the second wire unit 3024. The second wire unit 3024 as above may be formed by printing the conductive liquid metal on the first elastic layer or a base material by using a 3D printer, etc.

Here, the second wire unit 3024 may include a bent section 3243 that extends in the length direction (Y-direction) of the finger movement sensing unit 10 and then is bent in a direction (e.g., X-direction) intersecting with the length direction (Y-direction). In other words, the second wire unit 3024 includes a 2-1st wire unit 3241 that extends in a direction (Y-direction) parallel to the first wire unit 14 of the finger movement sensing unit 10 and a 2-2nd wire unit 3242 that extends in a direction (e.g., X-direction) intersecting with the parallel direction (Y-direction), and may include the bent section 3243 located between the 2-1st wire unit 3241 and the 2-2nd wire unit 3242. As described later, the finger movement sensing unit 10 may be arranged on the back of the hand and the pressure sensing unit 20 is arranged at the fingerprint region of the finger. In addition, by forming the bent section 3243, the finger movement sensing unit 10 and the pressure sensing unit 20 may be manufactured as one soft sensor module 3100.

In another embodiment, referring to FIG. 23B, the pressure sensing unit 20 may further include a pressing unit 3025 that is arranged overlapping the second sensor unit 3022. The pressing unit 3025 may include one or more protrusions each having a stiffness greater than that of the conductive liquid metal. The protrusions of the pressing unit 3025 are arranged on locations corresponding to the pattern of the second sensor unit 3022, and thus a pressed area in a pushing movement of the finger is reduced to increase a sensitivity of the sensor. In particular, the protrusions of the pressing unit 3025 may be formed as beads having a stiffness greater than that of the conductive liquid metal. The pressure sensing unit 20 may press the channels of the second sensor unit 3022 by using the small and hard protrusions, and thereby increasing sensitivity. The pressing unit 3025 may be arranged on the silicon sheet 3021, but the present disclosure is not limited thereto, that is, the pressing unit 3025 may be arranged between the first elastic layer and the second elastic layer of the silicon sheet 3021 or between other layers than the first elastic layer and the second elastic layer.

The protrusions of the pressing unit 3025 may be smaller than an entire size of the second sensor unit 3022, but may be greater than a thickness of one channel in the second sensor unit 3022. Also, the protrusion of the pressing unit 3025 is arranged at least on a center of the second sensor unit 3022, and then, a plurality of protrusions may be further arranged symmetrically based on the protrusion of the center. However, the present disclosure is not limited thereto, that is, the pressing unit 3025 may include a plurality of protrusions arranged on arbitrary locations while overlapping the second sensor unit 3022.

Operating principles of the second soft sensor are basically similar to those of the first soft sensor. That is, the second soft sensor may measure the applied pressure via a variation in the resistance of the conductive liquid metal, like in the first soft sensor. As described above, when the pressure is applied to the channel of the second sensor unit 3022, a cross-sectional area A of the channel is reduced due to the pressure and the resistance of the conductive metal increases. Here, the pressure sensing unit 20 may measure the magnitude of the pressure by using a proportional relationship, in which the resistance of the conductive metal increases as the pressure increases.

Hereinafter, the vibration providing unit 30 according to an embodiment of the present disclosure will be described in detail with reference to accompanying drawings.

Figure 24:
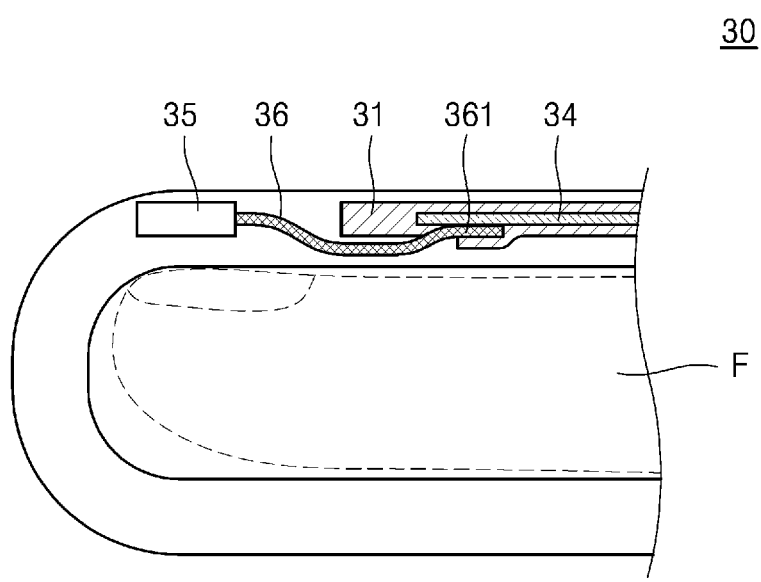
FIG. 24 is a cross-sectional view for illustrating a vibration providing unit according to an embodiment of the present disclosure.

FIG. 24 is a cross-sectional view for illustrating the vibration providing unit 30 according to an embodiment of the present disclosure.

Referring to FIG. 24, the vibration providing unit 30 is arranged at an end portion of a finger, and may include a vibrator 35 providing the finger with vibration, a third wire unit 34 electrically connected to the vibrator 35, and a connector 36 for connecting the vibrator 35 with the third wire unit 34.

The vibrator 35 is arranged at the end of the finger and may include a small-sized vibration motor. In particular, the vibrator 35 may be located above a nail of a finger F so as not to interfere with a grip operation of the user. The vibrator 35 may be arranged on the outside of the elastic sheet 31 to be electrically connected to a third wire unit 34 in the elastic sheet 31 via the connector 36, but the present disclosure is not limited thereto, that is, the vibrator 35 may be included in the elastic sheet 31.

The third wire unit 34 may be formed by printing the conductive liquid metal between the first elastic layer and the second elastic layer facing each other. The third wire unit 34 may be separately manufactured from the first soft sensor and the second soft sensor, but in the present specification, a case in which the third wire unit 34 is manufactured with the first and second soft sensors as one soft sensor module 3100, will be described.

The connector 36 may electrically connect the vibrator 35 and the third wire unit 34 on the outer portion of the first elastic layer and the second elastic layer to each other. An end of the connector 36 is connected to the vibrator 35, and the other end of the connector 36 includes a connection region 361 inserted into the elastic sheet 31, to be electrically connected to the third wire unit 34. The connection region 361 may be a region from which a coating of the connector 36 is removed.

The vibration providing unit 30 having the above structure provides the end portion of the finger of the user with vibration when the user is wearing the hand wearable device 1, and may effectively transfer haptic vibration feedback.

The soft sensor module 3100 of FIG. 21 is described in more detail below.

The soft sensor module 3100 includes a thumb sensing unit 3110, an index finger sensing unit 3120, a middle finger sensing unit 3130, a ring finger sensing unit 3140, and a little finger sensing unit 3150. The soft sensor module 3100 may include only some of the above sensing units. In addition, although not shown in the drawings, the soft sensor module 3100 may further include a first adduction/abduction measurement sensor (not shown) formed between the thumb sensing unit 3110 and the index finger sensing unit 3120, a second adduction/abduction measurement sensor (not shown) formed between the index finger sensing unit 3120 and the middle finger sensing unit 3130, and a third adduction/abduction measurement sensor (not shown) formed at a side surface of the index finger sensing unit 3120 to measure the adduction/abduction of the index finger.

The thumb sensing unit 3110 may include a first thumb part sensor 3111 and a second thumb part sensor 3112. The first thumb part sensor 3111 may measure flexion and extension between a distal phalanx and a proximal phalanx of the thumb. The second thumb part sensor 3112 may measure flexion and extension between the proximal phalanx and metacarpals of the thumb.

The index finger sensing unit 3120 may include a first index finger part sensor 3121 and a second index finger part sensor 3122. The first index finger part sensor 3121 may measure flexion and extension between a middle phalanx and a proximal phalanx of the index finger. The second index finger part sensor 3122 may measure flexion and extension between the proximal phalanx and metacarpals of the index finger.

The middle finger sensing unit 3130 may include a first middle finger part sensor 3231 and a second middle finger part sensor 3132. The first middle finger part sensor 3231 may measure flexion and extension between a middle phalanx and a proximal phalanx of the middle finger. The second middle finger part sensor 3132 may measure flexion and extension between the proximal phalanx and metacarpals of the middle finger.

The ring finger sensing unit 3140 may include a first ring finger part sensor 3141. The first ring finger part sensor 3141 may measure flexion and extension between a middle phalanx and a proximal phalanx of the ring finger.

The little finger sensing unit 3150 may include a first little finger part sensor 3151. The first little finger part sensor 3151 may measure flexion and extension between a middle phalanx and a proximal phalanx of the little finger.

The first adduction/abduction measurement sensor (not shown) is provided between the thumb sensing unit 3110 and the index finger sensing unit 3120 to measure the adduction and abduction of the thumb.

The second adduction/abduction measurement sensor (not shown) is provided between the index finger sensing unit 3120 and the middle finger sensing unit 3130 to measure the adduction and abduction of the middle finger.

The third adduction/abduction measurement sensor (not shown) is formed at a side of the index finger sensing unit 3120 to measure the adduction and abduction of the index finger.

Here, the soft sensor module 3100 according to an embodiment of the disclosure may further include a third adduction/abduction measurement sensor (not shown) at a side of the index finger in order to separate a signal from the adduction/abduction measurement sensor from a signal from a flexion and extension measurement sensor. That is, the third adduction/abduction measurement sensor (not shown) is additionally provided at a side of the index finger so as to independently measure the adduction/abduction of the index finger and the middle finger.

Here, each of the first thumb part sensor 3111, the second thumb part sensor 3112, the first index finger part sensor 3121, the second index finger part sensor 3122, the first middle finger part sensor 3131, the second middle finger part sensor 3132, the first ring finger part sensor 3141, and the first little finger part sensor 3151 may include the first sensor unit 12 in the first soft sensor of FIG. 22. Also, each of wire units 3280 extending from respective sensors may be the first wire unit 14 of the first soft sensor shown in FIG. 22.

In addition, the soft sensor module 3100 may include a thumb pressure sensing unit 3210, an index finger pressure sensing unit 3220, and a middle finger pressure sensing unit 3230. Although the pressure sensing units may be also provided on the index finger and the little finger, a case in which the pressure sensing units are provided on the thumb, the index finger, and the middle finger that are most frequently used in the gripping operation, will be described below.

The thumb pressure sensing unit 3210 may sense a pressure applied to the end of the thumb finger.

The index finger pressure sensing unit 3220 may sense a pressure applied to the end of the index finger.

The middle finger pressure sensing unit 3230 may sense a pressure applied to the end of the middle finger.

Here, each of the thumb pressure sensing unit 3210, the index finger pressure sensing unit 3220, and the middle finger pressure sensing unit 3230 may include the second sensor unit 3022 in the second soft sensor of FIG. 23A or FIG. 23B. Also, each of wire units 3280 extending from respective sensors may be the second wire unit 3024 in the second soft sensor of FIG. 23A or FIG. 23B.

The soft sensor module 3100 may also include a 3-1st wire unit 3311, a 3-2nd wire unit 3321, and a 3-3rd wire unit 3331 for the vibration providing unit 30. The 3-1st wire unit 3311, the 3-2nd wire unit 3321, and the 3-3rd wire unit 3331 may be respectively formed on regions corresponding to end portions of the thumb, the index finger, and the middle finger. The vibration providing unit 30 is also provided on the ring finger and the little finger, but in the present disclosure, a case in which the vibration providing unit 30 is provided on the thumb, the index finger, and the middle finger that are most frequently used in the gripping operation from among the fingers will be described.

The 3-1st wire unit 3311, the 3-2nd wire unit 3321, and the 3-3rd wire unit 3331 may be electrically connected to the vibrator (see 35 of FIG. 30) providing vibration. The 3-1st wire unit 3311, the 3-2nd wire unit 3321, and the 3-3rd wire unit 3331 may be easily and electrically connected to the vibrator (35 of FIG. 30) by forming a part at the end of the finger to be wider than the channel of another sensor unit or increasing a separation distance between channels.

Here, in the soft sensor module 3100 according to an embodiment of the present disclosure, a plurality of channel patterns corresponding to joints and end portions of various fingers having different lengths and shapes may be integrally designed with one hand wearable device by using CAD. That is, because the channel patterns are designed by using CAD in the present disclosure, it is easy to design the plurality of channel patterns at once.

As described above, because the plurality of first sensor units 12 and the second sensor units 3022 may be formed at once by using 3D printing, etc., a large-sized sensor may be easily manufactured. Also, a mold for forming the plurality of channel patterns is not necessary, and thus, the manufacturing processes may be simplified and manufacturing costs may be reduced.

Because the soft sensor according to the present disclosure has no limitation in size thereof, has a very small thickness, and elasticity, and the first sensor units 12 or the second sensor units 3022 of various numbers and shapes may be formed. Thus, the soft sensor may be applied to joints such as shoulders, ankles, wrists, and fingers having various sizes and complicated movements.

Although not shown in the drawings, the soft sensor module 3100 may further include a chip. The chip may be inserted into a location, in the elastic sheet 11 or 3021, corresponding to a wrist. The chip may be inserted by an insert printing method. The chip may include an FPCB, a motor driver, a micro-control unit, a wireless communication unit, etc.

Also, the soft sensor module 3100 according to an embodiment of the disclosure may further include an electrode substrate 3270 and a connector 3290.

The electrode substrate 3270 is formed on the soft sensor module 3100 so as to connect an external electronic device (e.g., connector, etc.) to soft sensors. Here, the electrode substrate 3270 may include various circuit boards such as an FPCB, etc. In addition, the electrode substrate 3270 may be in contact with or coupled to an external connector, etc.

Here, the electrode substrate 3270 may be formed by an insert printing method. That is, a first elastic layer is formed, and after that, the electrode substrate 3270 may be inserted onto the first elastic layer. Here, the electrode substrate 3270 may be located on a region on the first elastic layer, wherein the electrode substrate 3270 is not interfered with a movement of the wrist and does not infiltrate into locations of the sensors. Also, the electrode substrate 3270 may be located on a region where distances between the sensors and the electrode substrate 3270 may be minimized in order to minimize a length of the first wire unit 14 or the second wire unit 3024. For example, the electrode substrate 3270 may be formed on the back of the hand, which is adjacent to the wrist. For ensuring durability, a periphery of the electrode substrate 3270 may need to be reinforced with a hard material, and thus, the electrode substrate 3270 may be located at the back of the hand, not on the wrist part which flexibly moves. The location and method of forming the electrode substrate 3270 will be described in more detail later.

The connector 3290 may connect the wire units 3280 to the electrode substrate 3270. The connector 3290 may include a certain conductive material, e.g., an applicable liquid or solid type conductive material. For example, the connector 3290 may be formed of the conductive liquid metal that is in a liquid phase having conductivity at room temperature. Here, the conductive liquid metal may include EGaIn as an example.

The connector 3290 may be formed in a preset pattern by using a conductive liquid metal, and the connector 3290 may be formed of a material such as EGaIn by various methods such as a 3D printing method, a nozzle printing method, an inkjet printing method, a roll-to-roll printing method, etc.

Also, according to the present disclosure, an electrode unit may be stably formed regardless of a thickness of a channel, a channel size, the number of channels, a material of the soft sensor, etc. In addition, automation may be achieved by using the printing equipment, and thus, an effect of reducing working time may be obtained. Also, an electrode unit having a compact structure may be formed.

FIGS. 25 to 28B are diagrams illustrating a method of manufacturing a hand wearable device according to an embodiment of the present disclosure.

Here, the hand wearable device may be formed as a glove in which the soft sensor module 3100 having the above-described configuration is built. However, one or more embodiments of the present disclosure are not limited thereto.

Although not shown in the drawings, the soft sensor module 3100 may be formed by sequentially arranging, on a base material, the first elastic layer; the conductive liquid metal including the first sensor units 12, the second sensor units 3022, the first wire unit 14, the second wire unit 3024, and the third wire unit 34; and the second elastic layer.

In more detail, according to the method of manufacturing the soft sensor module 3100, a first elastic material is spin-coated on the base material to form the first elastic layer, and the electrode substrate (3270 of FIG. 21) may be arranged on the first elastic layer. Also, according to the method of manufacturing the soft sensor module, the conductive liquid metal is printed on the first elastic layer by using a nozzle to form the first sensor units 12, the second sensor units 3022, the first wire unit 14, the second wire unit 3024, and the third wire unit 34. The nozzle may be coupled to a CNC facility and may be controlled to be movable in three-axis direction. The CNC facility may include a 3D printer, and may further include a three-axis controller, a scan controller, a microscope, etc. The nozzle may print a pattern by using the conductive liquid metal while moving in a preset path according to a control of the three-axis controller. The path in the three-axis direction may be set separately according to a channel pattern. Next, according to the method of manufacturing the soft sensor, the connector (3290 of FIG. 21) for connecting the wire unit (3280 of FIG. 21) to the electrode substrate (3270 of FIG. 21) is printed. The connector (3290 of FIG. 21) is provided in or on a side of the elastic sheet to connect the wire unit (280 of FIG. 21) to the electrode substrate (270 of FIG. 21).

Next, the second elastic material is applied to the first elastic layer, on which the first sensor units 12, the second sensor units 3022, the first wire unit 14, the second wire unit 3024, and the third wire unit 34 are formed, to form the second elastic layer. Here, the second elastic layer may be formed of the same material as that of the first elastic layer, or may be formed as a layer having a different physical property from that of the first elastic layer as necessary.

Here, the conductive liquid metal of the first and second sensor units 12 and 3022 is in the liquid phase, but a surface tension of the conductive liquid metal is very high. Thus, even when the second elastic material is applied onto the sensor units in the liquid phase, the second elastic material and the conductive liquid metal are not mixed with each other. Therefore, the channel pattern of the sensor unit may be covered by the second elastic material while maintaining the shape thereof.

Next, the second elastic layer is hardened, the second elastic layer is cut as a desired shape through a laser cutting, a knife cutting, a knife mold cutting process, to form the soft sensor module 3100. Next, the soft sensor module is detached from the base material, and then, the soft sensor module 3100 as shown in FIG. 21 may be completed.

Figure 25:
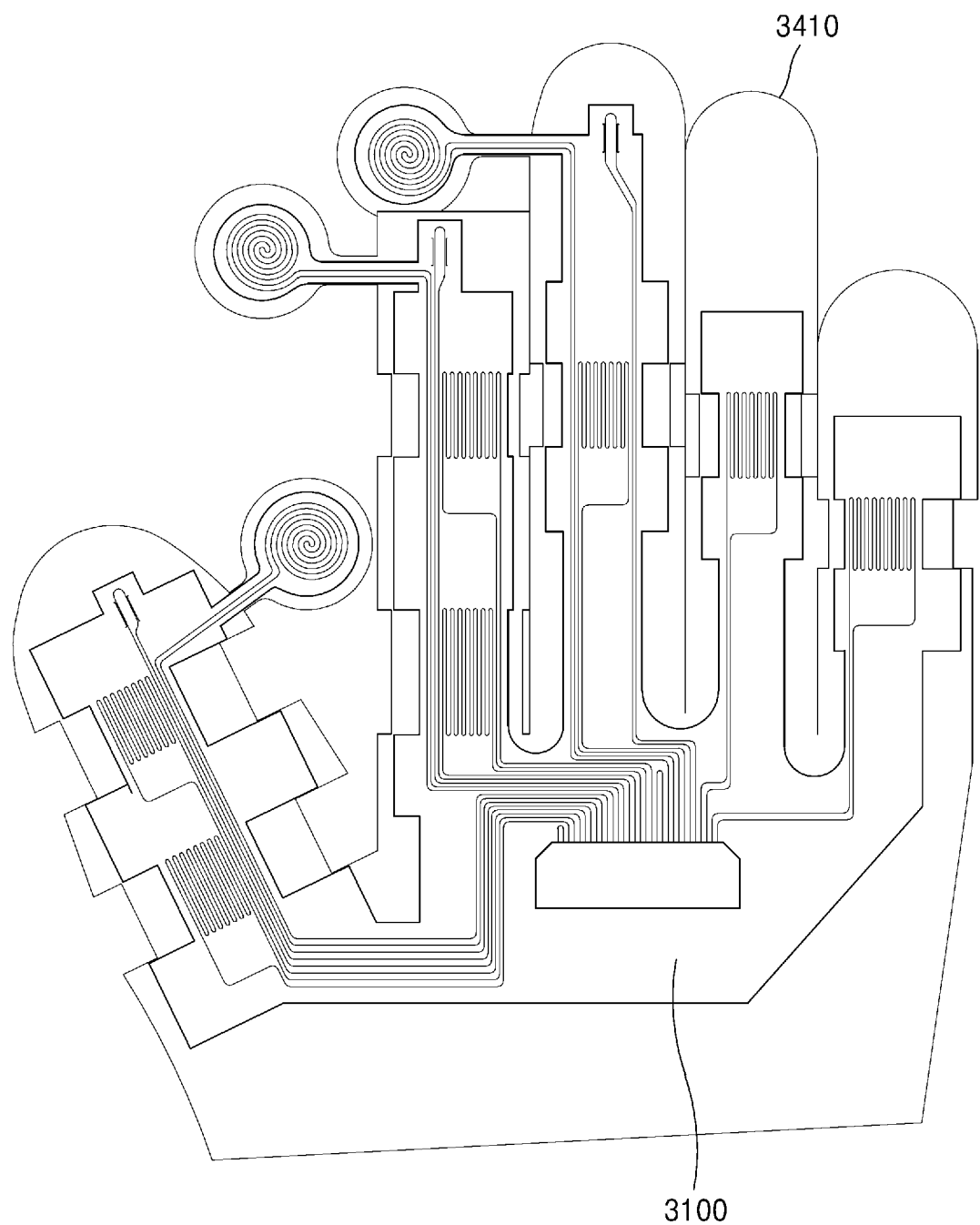
FIGS. 25 to 28B are diagrams illustrating a method of manufacturing a hand wearable device according to an embodiment of the present disclosure.

The soft sensor module 3100 is attached to the inside skin 3410 of the glove and is formed as the shape shown in FIG. 25. Here, the soft sensor module 3100 and an inside skin 3410 of the glove may be bonded to each other via silicone, other adhesives, etc.

Figure 26:
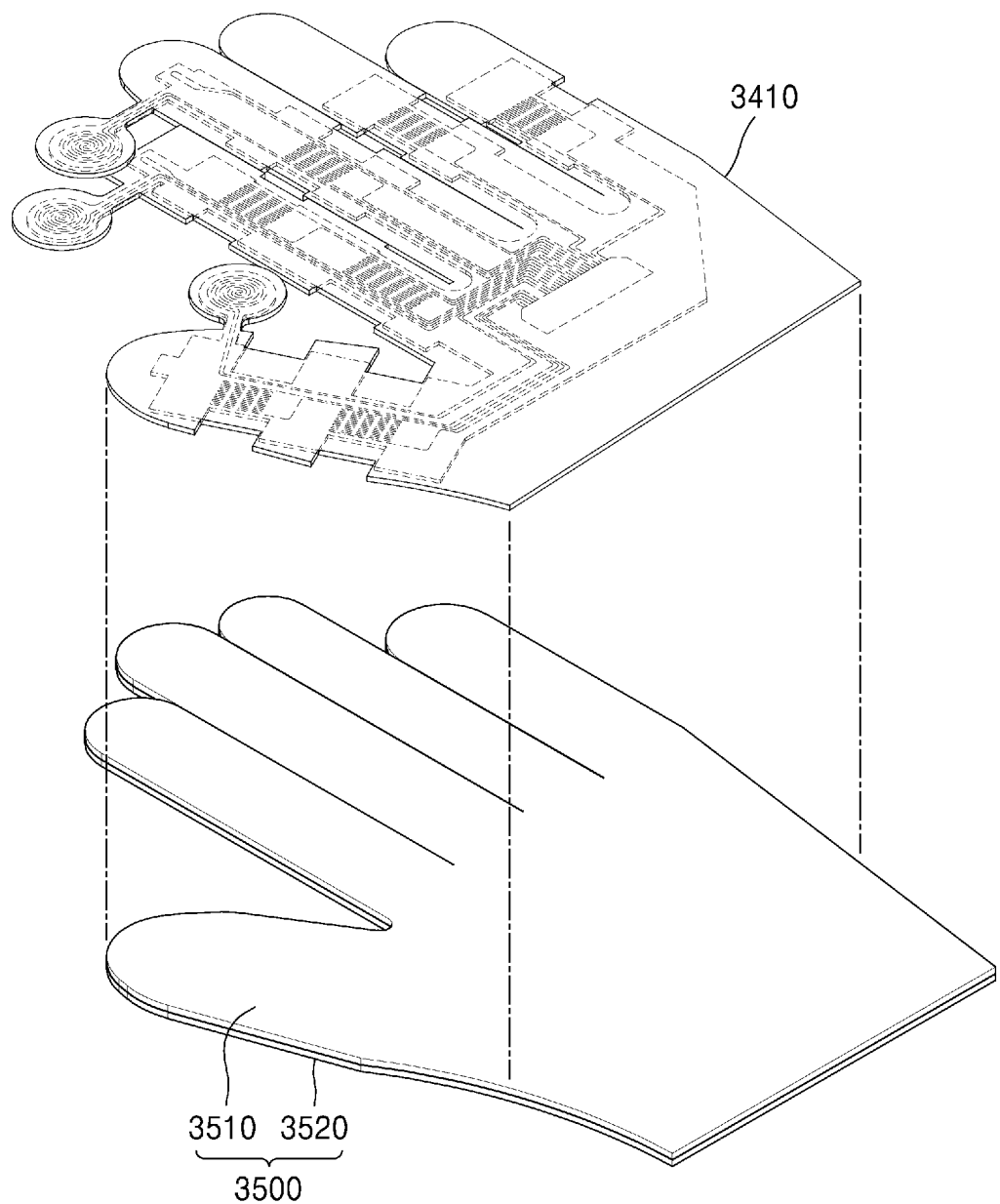

Next, as shown in FIG. 26, the inside skin 3410 of the glove, to which the soft sensor module 3100 is coupled, may be coupled to an outside skin 3500 of the glove including an outside skin upper plate 3510 and an outside skin lower plate 3520. Here, various sewing operations, e.g., attaching of a hook-and-loop fastener and forming of an opening, may be performed on the inside skin 3410 and the outside skin upper plate 3510 of the glove, as necessary.

Figure 27A:
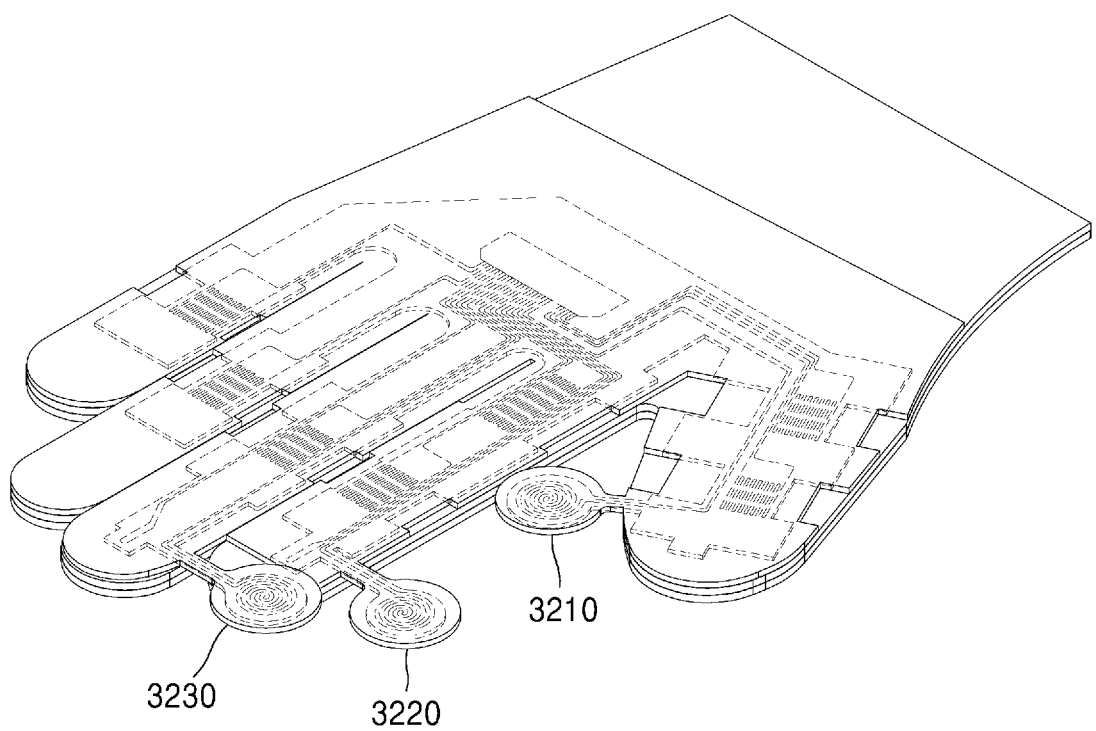
Figure 27B:
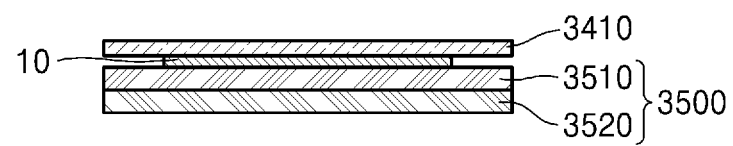

The soft sensor module 3100 may be coupled between the inside skin 3410 of the glove and the outside skin upper plate 3510 of the glove, as shown in FIG. 27. However, the pressure sensing units 3210, 3220, and 3230 are not coupled to the outside skin upper plate 3510 of the glove yet. The inside skin 3410 of the glove and the outside skin upper plate 3510 of the glove may be coupled to each other in a state in which the finger movement sensing unit 10, except for the pressure sensing unit 20, is arranged on the inside skin 3410 of the glove and the outside skin upper plate 3510 of the glove.

Figure 28A:
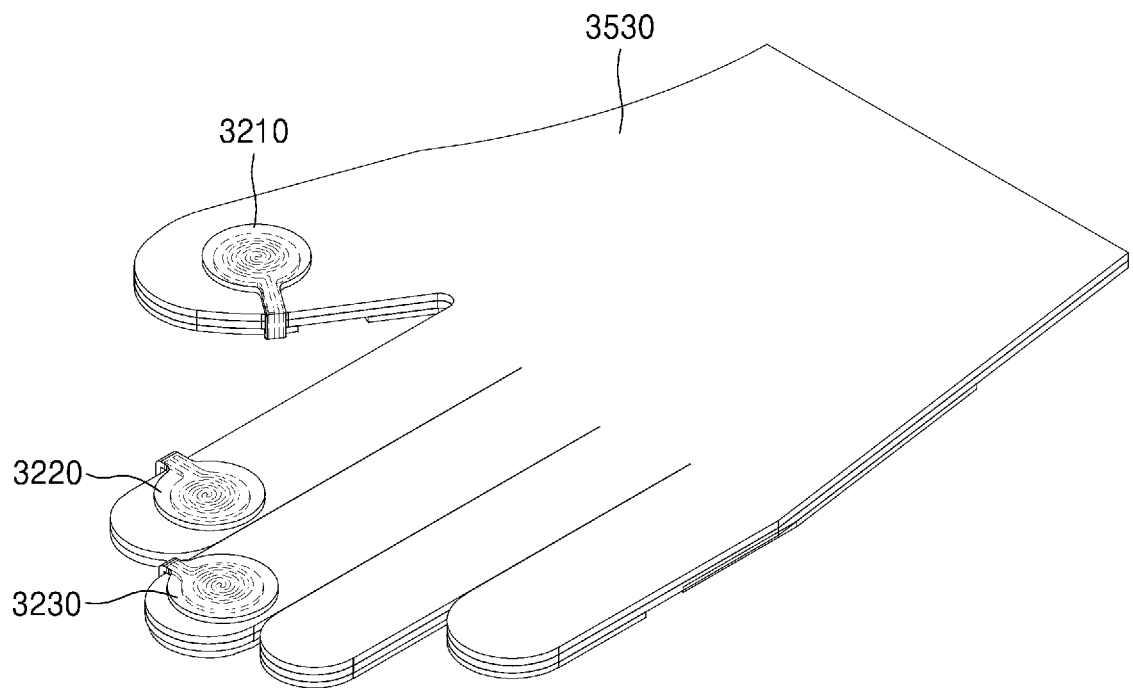
Figure 28B:
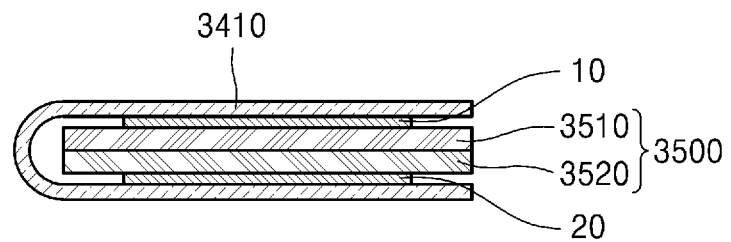

Next, as shown in FIGS. 28A and 28B, the pressure sensing units 3210, 3220, and 3230 may be coupled to an outside skin lower plate 3520 of the glove. In more detail, the pressure sensing units 3210, 3220, and 3230 may be attached to the outside skin lower plate 3520 of the glove on regions corresponding to fingerprint regions of the fingers. The pressure sensing units 3210, 3220, and 3230 and the outside skin lower plate 3520 of the glove may be coupled to each other via silicone, other adhesives, etc. In other words, the finger movement sensing unit 10 is provided on the inside skin 3410 of the glove and the outside skin upper plate 3510 of the glove, so that the finger movement sensing unit 10 may be located on the back of the user's hand when the user wears the hand wearable device 1. Also, the pressure sensing unit 20 may be on the inside skin 3410 of the glove and the outside skin lower plate 3520 of the glove, so that the pressure sensing unit 20 may be located under the palm of the user when the user wears the hand wearable device 1.

Here, in the hand wearable device 1, the sewing is performed along outlines of the outside skin upper plate 3510 and the outside skin lower plate 3520 of the glove, and thus, a space in which the hand may enter may be formed between the outside skin upper plate 3510 and the outside skin lower plate 3520. When the glove is turned over from the above state, the outer appearance of the glove having the soft sensor module 3100 built therein is completed as shown in FIG. 20.

Figure 29:
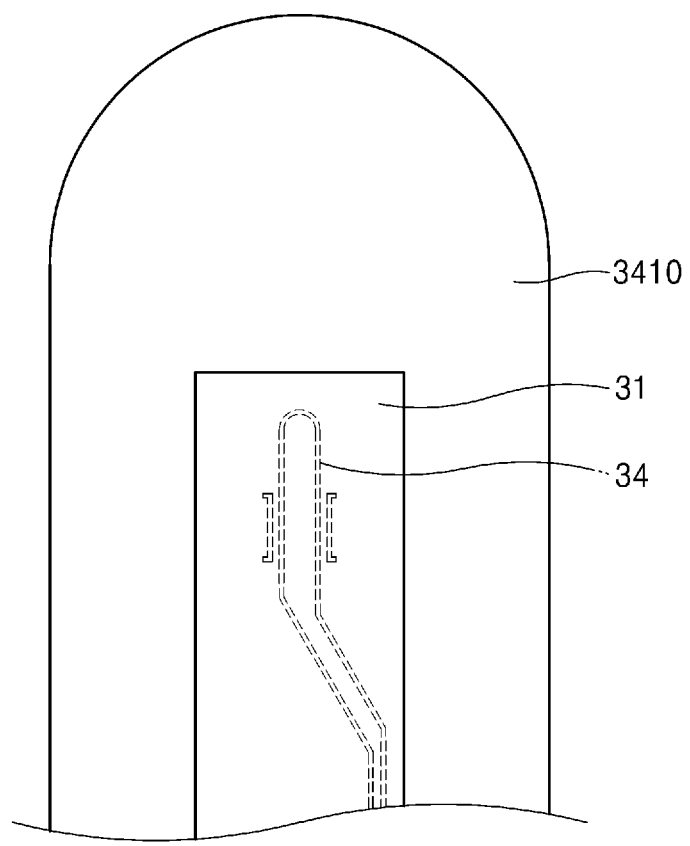
FIGS. 29 to 31 are diagrams for illustrating a method of manufacturing a hand wearable device including a vibration providing unit.
Figure 30:
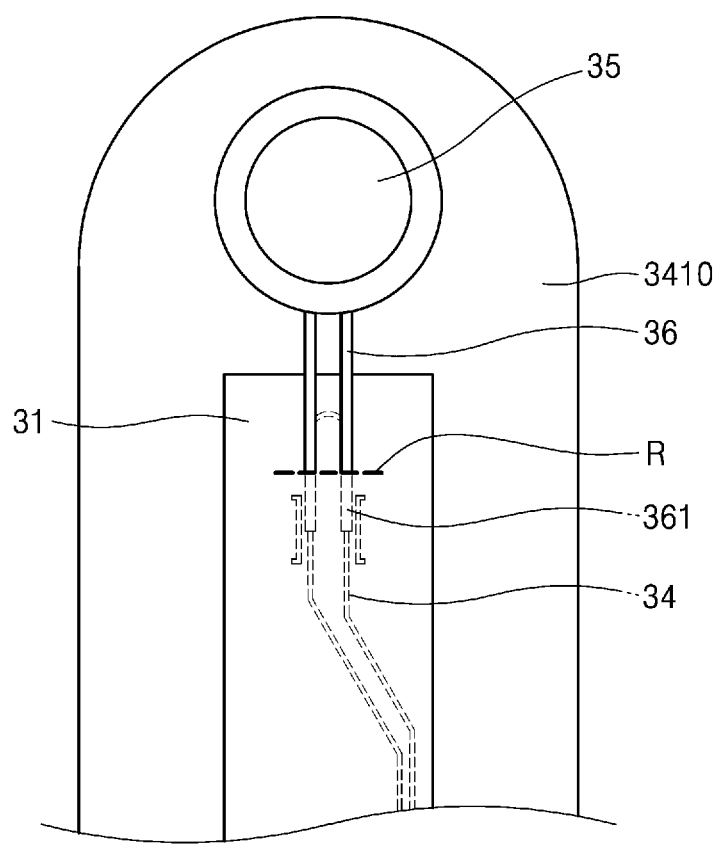
Figure 31:
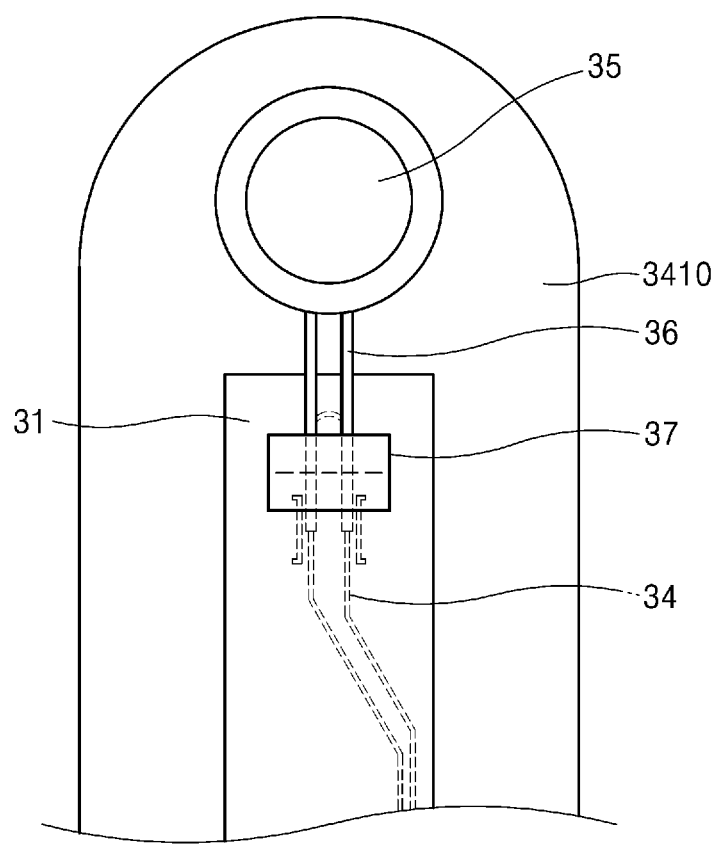

FIGS. 29 to 31 are diagrams for illustrating a method of manufacturing a hand wearable device including a vibration providing unit.

As shown in FIG. 29, the third wire unit 34 may be formed in the elastic sheet 31 with the first sensor unit 12 and the second sensor unit 3022. The third wire unit 34 may be easily and electrically connected to the vibrator (35 of FIG. 30) by forming a part at the end of the finger to be greater than the channel of another sensor unit or increasing a separating distance between the channels.

Next, as shown in FIG. 30, the elastic sheet 31 on the third wire unit 34 is partially cut in a state in which the vibrator 35 is arranged outside the elastic sheet 31, and the connection region 361 at the other end of the connector 36 may be inserted into the elastic sheet 31 through a cut portion R. The connection region 361 inserted in the elastic sheet 31 may be shorted with the third wire unit 34 that is the liquid metal to be electrically connected.

Next, as shown in FIG. 31, according to the method of manufacturing the hand wearable device, the fixing portion 37 may be formed on the cut portion R. The fixing portion 37 may fix the connector 36 including the connection region 361 onto the elastic sheet 31 so that the connection region 361 does not fall out. The fixing portion 37 may include an adhesive such as bond, or an adhesive tape. In addition, the vibrator 35 may be fixed on the inside skin 3410 of the glove or the outside skin upper plate 3510 of the glove, and as such, the durability of the hand wearable device 1 may be improved. The above process may be performed any time before and after the sewing of the glove.

As described above, the hand wearable device according to the embodiments of the present disclosure includes the finger movement sensing unit and the pressure sensing unit including the soft sensors, and thus, the finger movement may be measured, and moreover, the pressure at the fingertip may be measured. Also, the hand wearable device may not only sense the user movement, but also provide the user with the haptic vibration feedback by using the vibration provider.

The particular implementations shown and described herein are illustrative examples of the disclosure and are not intended to otherwise limit the scope of the disclosure in any way. For the sake of brevity, electronics, control systems, software, and other functional aspects of the systems according to the related art may not be described in detail. Furthermore, the connecting lines or connectors shown in the drawings are intended to represent example functional relationships and/or physical or logical couplings between the various elements. It should be noted that many alternative or additional functional relationships, physical connections, or logical connections may be present in a practical device. Moreover, no item or component is essential to the practice of the disclosure unless the element is specifically described as "essential" or "critical".

The singular forms "a," "an" and "the" in the specification of the embodiments, in particular, claims, may be intended to include the plural forms as well. Unless otherwise defined, the ranges defined herein is intended to include values within the range as individually applied and may be considered to be the same as individual values constituting the range in the detailed description. Finally, operations constituting methods may be performed in appropriate order unless explicitly described in terms of order or described to the contrary. The present disclosure is not limited to the described order of the steps. The use of any and all examples, or example language (e.g., "such as") provided herein, is intended merely to better illuminate the present disclosure and does not pose a limitation on the scope of the present disclosure unless otherwise claimed. Also, those of ordinary skill in the art will readily appreciate that many alternations, combinations and modifications, may be made according to design conditions and factors within the scope of the appended claims and their equivalents.

One or more of the above embodiments may be embodied in the form of a computer program that may be run in and/or executed by a computer through various elements, and the computer program may be recorded on a non-transitory computer-readable recording medium. In this case, the medium may continue to store a program executable by a computer, or may be stored for execution or download. In addition, the medium may be a variety of recording units or storage units in the form of a single or several hardware combined, and is not limited to a medium directly connected to any computer system, but may be distributed on the network. Examples of the medium include magnetic media such as hard disks, floppy disks and magnetic tape, optical recording media such as CD-ROMs and DVDs, magneto-optical media such as floptical disks, and ROM, RAM, flash memory, etc., configured to store program instructions. In addition, examples of another medium may include a recording medium or a storage medium managed by App store that distributes applications, a site that supplies or distributes various software, a server, etc. While the present disclosure has been described with reference to specific details, such as detailed components, specific embodiments, and drawings, these are only examples to facilitate the overall understanding of the present disclosure and the present disclosure is not limited thereto. It will be understood by those who skilled in the art that various modifications and changes may be made from the descriptions above.

Therefore, the spirit of the present disclosure shall not be limited to the above-described embodiments, and the entire scope of the appended claims and their equivalents will fall within the scope and spirit of the disclosure.

The invention claimed is:

1. A sensor embedded glove comprising:
an upper inside skin pattern;
a sensor module coupled to at least a surface of the upper inside skin pattern, and including at least one sensor disposed on a joint portion of a finger to measure flexion and extension of the finger; and
an outside skin coupled to the upper inside skin pattern and exposed to outside,
wherein the outside skin includes an upper outside skin pattern and a lower outside skin pattern coupled to the upper outside skin pattern,
wherein the upper outside skin pattern is coupled to the upper inside skin pattern,
wherein the soft sensor module comprises
an elastic sheet including a first elastic layer and a second elastic layer facing each other,
wherein the at least one sensor includes a conductive liquid metal printed between the first elastic layer and the second elastic layer,
wherein the first elastic layer and the second elastic layer include materials different from that of the upper outside skin pattern,
wherein, in the upper inside skin pattern, a region to which the at least one sensor is coupled has a width less than a width of another region, and
wherein the upper inside skin pattern and the upper outside skin pattern are coupled by sewing at a region other than a region where the at least one sensor is disposed, such that sewing lines are disposed at the sewed region other than the region where the at least one sensor is disposed.

2. The soft sensor embedded glove of claim 1, wherein the lower outside skin pattern has an opening formed in a region corresponding to a palm.

3. The soft sensor embedded glove of claim 1, wherein the upper outside skin pattern includes a material having an extension rate different from that of a material included in the lower outside skin pattern.

4. The soft sensor embedded glove of claim 3, wherein the upper outside skin pattern includes a material having an extension rate higher than that of a material included in the lower outside skin pattern.

5. The soft sensor embedded glove of claim 1, further comprising an elastic member formed on a region corresponding to a metacarpophalangeal (MCP) joint sensor in the soft sensor embedded glove.

6. The soft sensor embedded glove of claim 1, wherein the upper inside skin pattern includes at least one groove formed in a region adjacent to flail the region to which the at least one sensor is coupled.

* * * * *